United States Patent [19]
Sugiura

[11] Patent Number: 5,856,714
[45] Date of Patent: *Jan. 5, 1999

[54] HYBRID TYPE STEPPING MOTOR

[75] Inventor: Tsuneo Sugiura, Nagano-ken, Japan

[73] Assignee: Tamagawa Seiki Kaubushiki Kaisha, Nagano-Ken, Japan

[*] Notice: The term of this patent shall not extend beyond the expiration date of Pat. No. 5,834,865.

[21] Appl. No.: 721,621

[22] Filed: Sep. 26, 1996

[30] Foreign Application Priority Data

Jul. 5, 1996 [JP] Japan ..................................... 8-176865

[51] Int. Cl.$^6$ .................................................. H02K 37/24
[52] U.S. Cl. ..................... 310/49 R; 310/67 R; 310/164; 310/112; 310/114
[58] Field of Search ................................ 310/49 R, 67 R, 310/164, 112, 114; 360/98.07, 99.04, 99.08

[56] References Cited

U.S. PATENT DOCUMENTS

| | | | |
|---|---|---|---|
| 4,127,802 | 11/1978 | Johnson | 318/696 |
| 4,501,980 | 2/1985 | Welburn | 310/12 |
| 4,713,570 | 12/1987 | Mastromattei | 310/154 |
| 4,936,775 | 6/1990 | Mori | 310/49 R |
| 4,952,859 | 8/1990 | Torisawa et al. | 318/696 |
| 5,289,066 | 2/1994 | Clark | 310/67 R |
| 5,506,458 | 4/1996 | Pace et al. | 310/67 R |

Primary Examiner—Clayton LaBalle
Assistant Examiner—Timothy A. Williams
Attorney, Agent, or Firm—Sughrue, Mion, Zinn, Macpeak & Seas, PLLC

[57] ABSTRACT

A hybrid type stepping motor includes coils located on the outer or inner periphery of stator yokes provided on a fixed shaft. This structure allows the coils to be disposed more easily and thus at a lower cost. Furthermore, it is possible to achieve a great increase in the density of winding. Auxiliary magnetic plates and auxiliary magnets are disposed at both ends of a stator yoke assembly so that a magnetic circuit is formed at both ends. According to the invention, a motor having any desired number of phases may be achieved. A magnet is disposed in each space between adjacent teeth of either a rotor or a stator or otherwise of both rotor and stator. The magnetomotive force of the magnet suppresses leakage magnetic flux and concentrates the magnetic flux within the region between the rotor and stator. As a result, in operation, an abrupt change in the magnetic flux can be obtained, which leads to an increase in the torque.

31 Claims, 28 Drawing Sheets

(OUTER ROTOR TYPE)

(OUTER ROTOR TYPE)

(INNER ROTOR TYPE)

(TWO PHASE TYPE)

FIG. 20 (5 PHASE TYPE)

(TWO PHASE TYPE)

FIG. 30 (FIVE PHASE TYPE)

HYBRID TYPE STEPPING MOTOR

BACKGROUND OF THE INVENTION

1. Field of the Invention

The present invention relates to a stepping motor of the hybrid type, and more particularly, to a stepping motor of the hybrid type having an improved structure in which there are provided coils having a high-density winding, which can be easily wound and mounted on the motor and thus can be produced at a low cost, and furthermore in which an abrupt change in the magnetic flux is obtained which leads to an increase in the torque.

2. Description of the Related Arts

In a known stepping motor of the hybrid type, as shown in FIG. 1, a revolving shaft 1 is fitted in a pair of bearings 2, 3 located at either end a casing 4 in such a manner that the revolving shaft 1 can freely rotate. A stator yoke 6 including a stator yoke 5 and having a ring shape in general is disposed on the inner wall 4a of the stator case 4. A plurality of stator teeth 7 are formed on the inner wall of the stator yoke 6 at predetermined intervals in a circumferential direction. Between the bearings 2 and 3, there are provided first and second ring-shaped rotor yokes 9, 10 formed in an integral fashion wherein the first and second ring-shaped rotor yokes 9 and 10 are separated from each other via a magnet plate 8 in the axial direction. A plurality of rotor teeth 9a and 10a are formed on the periphery of each rotor yoke 9, 10. The respective rotor yokes 9 and 10 form magnetic poles with polarities opposite to each other. In this structure, the rotor yokes 9, 10 can rotate in a stepping fashion in response to a driving pulse supplied to the stator coil 5 from a driving circuit (not shown).

The conventional hybrid type stepping motor having the structure described above has the following problems.

In the case of a stepping motor having the above-described hybrid structure in which a magnet plate is located between two rotor yokes, stator coils are wound around the respective teeth located inside the casing. However, in this structure, it is difficult to wind a coil around each tooth. Therefore, a high density of coil winding cannot be realized. Furthermore, the torque is not high enough when used as a D/D motor.

SUMMARY OF THE INVENTION

It is a general object of the present invention to solve the above problems. More specifically, it is an object of the present invention to provide a hybrid type stepping motor having high-winding-density coils which can be easily wound and mounted. It is another object of the present invention to provide a hybrid type stepping motor which can operate with a high efficiency and can produce a high torque. It is still another object of the present invention to provide a hybrid type stepping motor having the above features at a low cost.

According to the present invention, there is provided a hybrid type stepper characterized in that: magnets are disposed either in each space between adjacent rotor teeth or in each space between adjacent stator teeth or otherwise disposed in each space between adjacent rotor teeth and also in each space between adjacent stator teeth in such a manner that the direction of magnetic flux within each magnet is opposite to the direction of magnetic flux present between a rotor and a stator thereby suppressing leakage magnetic flux which would otherwise occur between adjacent teeth or at sides of teeth and thus achieving an abrupt change in the magnetic flux which results in an increase in torque; and coils are disposed on the outer or inner periphery of a core, which makes it easier to wind and mount the coils.

DESCRIPTION OF THE PREFERRED EMBODIMENTS

Figure 1:
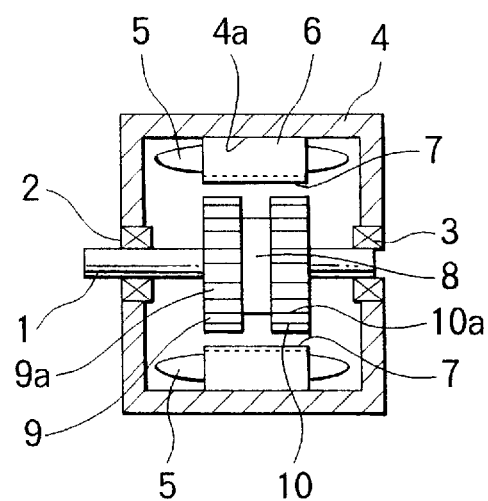
FIG. 1 is a cross-sectional view illustrating a conventional stepping motor.

With reference to preferred embodiments, the hybrid type stepping motor according to the present invention will be described in further detail below in conjunction with the accompanying drawings. In the drawings, similar parts or elements to those of FIG. 1 will be denoted by similar reference numerals.

Figure 2:
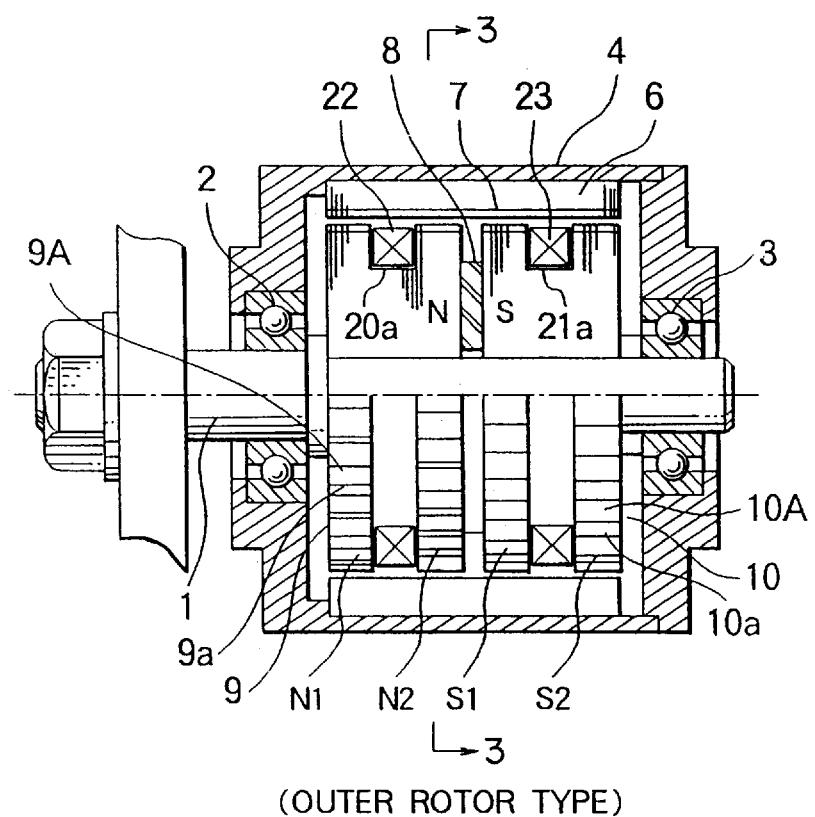
FIG. 2 is a cross-sectional view illustrating a 2-phase stepping motor of the hybrid type having an outer rotor structure according to the present invention.

FIG. 2 illustrates a hybrid type stepping motor with an outer-rotor structure. In this figure, reference numeral 1 denotes a fixed shaft made of a non-magnetic material. On this fixed shaft, there is provided a pair of bearings 2 and 3 spaced from each other. A rotor case 4 formed into a ring shape in general is disposed on the fixed shaft via the pair of bearings 2 and 3 in such a manner that the rotor case 4 can freely rotate. On the inner wall of this rotor case 4, there is provided a ring-shaped rotor yoke 6 having a plurality of rotor teeth 7. A magnet 7A is embedded in each slot between adjacent rotor teeth 7.

Figure 3:
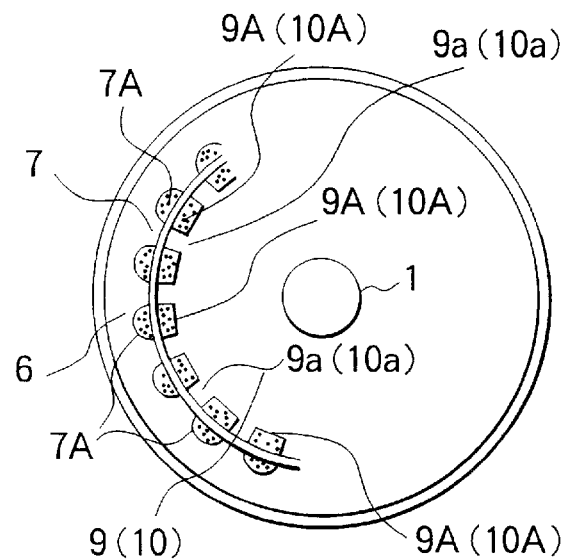
FIG. 3 is a transverse sectional view taken along line X–X' of FIG. 2.
Figure 4:
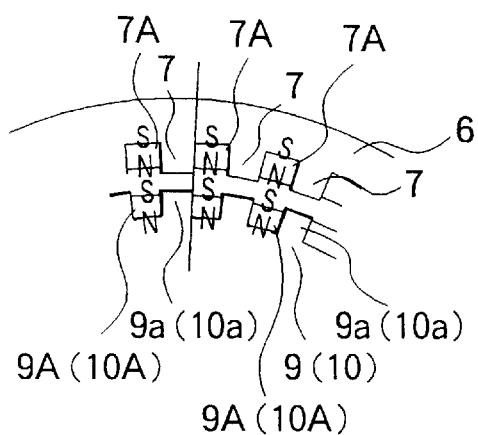
FIG. 4 is an enlarged view of the major part of FIG. 3.
Figure 7:
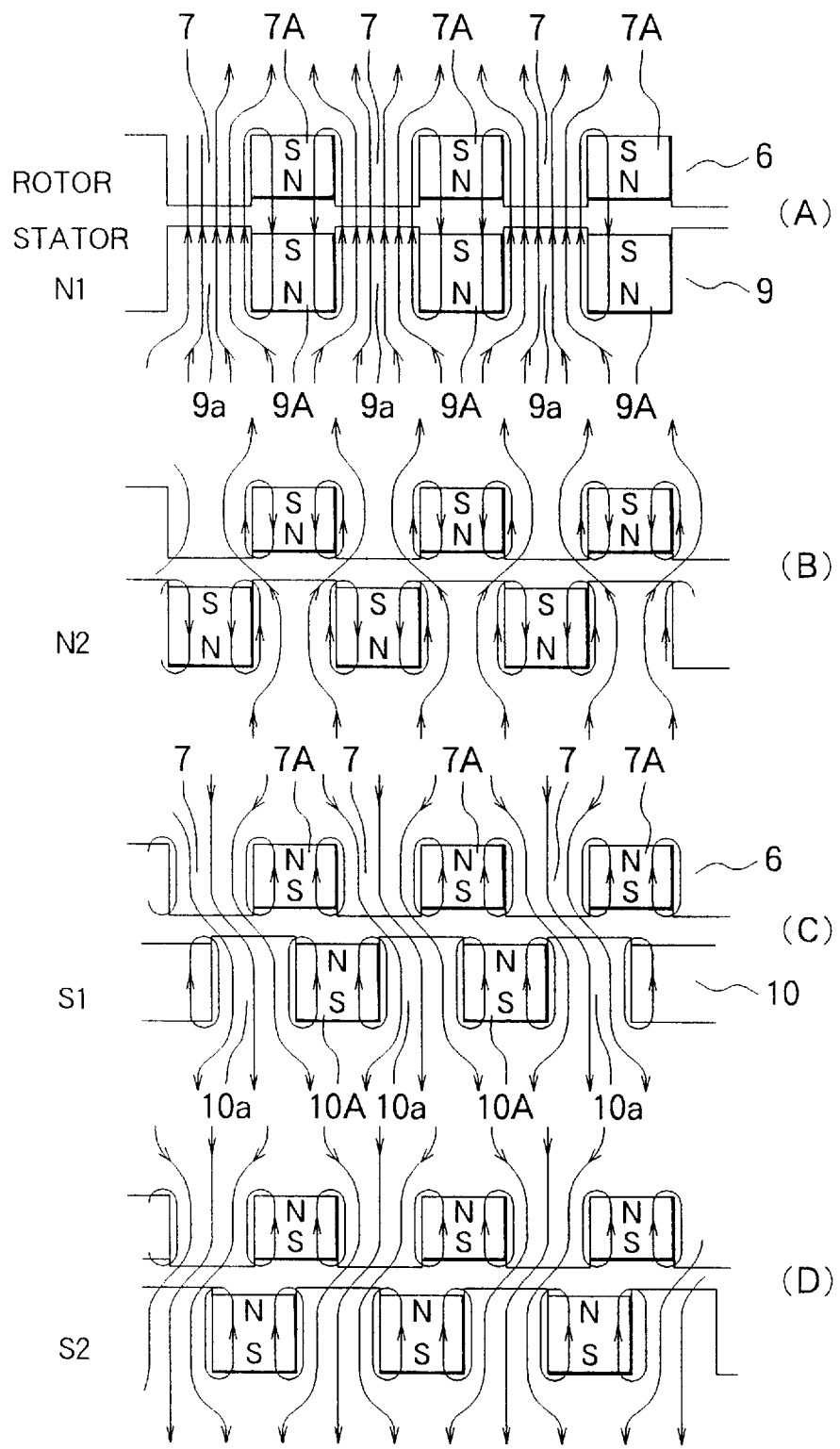
FIG. 7 is a schematic diagram illustrating the flow of magnetic flux associated with each magnetic pole shown in FIG. 2.

On the fixed shaft 1, there are provided first and second ring-shaped stator yokes 9, 10 formed in an integral fashion at parallel locations apart from each other in the axial direction via a magnet plate 8. First and second coil reception slots 20a and 21a are formed on the periphery of the respective stator yokes 9 and 10, at the center in the axial direction of each stator yoke 9, 10. A first coil 22 and a second coil 23 wound into the form of a bobbin are disposed in the respective coil reception slots 20a and 21a (each coil 22, 23 is wound using an automated winding machine). First and second north poles N1 and N2 are formed on the periphery of the first stator yoke 9 in such a manner that the first coil 22 is located between the first and second north poles N1 and N2. First and second south poles S1 and S2 are formed on the periphery of the second stator yoke 10 in such a manner that the second coil 23 is located between the first and second south poles S1 and S2. These poles N1, N2, S1, and S2 correspond to the respective rotor teeth 7. A plurality of stator teeth 9a and 10a are formed on the periphery of the poles N1, N2, S1, and S2 in such a manner that the pitch of the stator teeth 9a and 10a is equal to that of the rotor teeth 7. In the poles N1 and N2, as can be seen from FIG. 8, stator teeth 9a and 10a are formed in such a manner that the locations of the teeth on the pole N1 are shifted by an amount of ½ pitch relative to the locations of the teeth on the pole N2. Similarly, the locations of the teeth on the pole S1 are shifted by an amount of ½ pitch relative to the locations of the teeth on the pole S2. The locations of the stator teeth 9a and 10a of the north poles N1 and N2 are shifted by an amount of ¼ pitch relative to the locations of the teeth of the south poles S1 and S2, respectively. Furthermore, as shown in FIG. 3, a magnet 9A is embedded in each space between adjacent stator teeth 9a, and a magnet 10A is embedded in each space between adjacent stator teeth 10a. FIG. 7 shows the magnetic flux associated with the first and second north poles N1 and N2 and the first and second south poles S1 and S2 as seen in the axial direction of the hybrid type stepping motor shown in FIG. 2. The magnets are disposed so that the poles of the respective magnets point in radial directions of the ring-shaped rotor yoke 6 and the stator yokes 9 and 10. As shown in FIG. 7, the directions of magnetic flux flowing through the magnets 7A, 9A, and 10A are opposite to the directions of magnetic flux flowing between the ring-shaped rotor yoke 6 and the stator yoke 9 or 10. The polarities of the magnets 7A, 9A, and 10A are arranged so that these magnets 7A, 9A, and 10A are repelled by the magnet plate 8. FIGS. 7A–7D illustrate the magnetic flux associated with the poles N1, N2, S1, and S2, respectively. The magnetomotive forces of the magnets 7A, 9A, and 10A cause the major magnetic flux originating from the magnet plate 8 to concentrate on the regions between the rotor teeth 7 and the stator teeth 9a or 10a. Thus leakage flux, which would otherwise occur toward regions other than the teeth 7, 9a, 10a, is suppressed. As a result, a greater magnetic flux density is achieved, which results in an increase in the torque of rotation. The suppression of the leakage magnetic flux results in an abrupt change in the magnetic flux or the distribution of magnetic flux, and thus greater torque can be achieved. As for the magnets 7A, 9A, and 10A described above, a magnet may be disposed either in each space between rotor teeth 7 or in each space between stator teeth 9a and 10a or otherwise may be disposed in each space between rotor teeth 7 and also in each space between stator teeth 9a and 10a.

Figure 5:
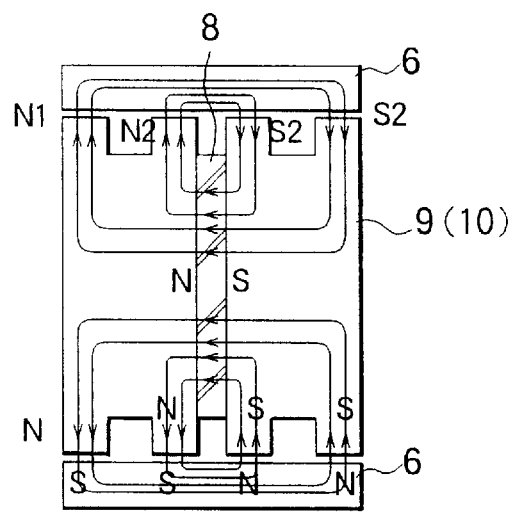
FIG. 5 is a schematic diagram illustrating the flow of magnetic flux generated by each magnet plate.
Figure 6:
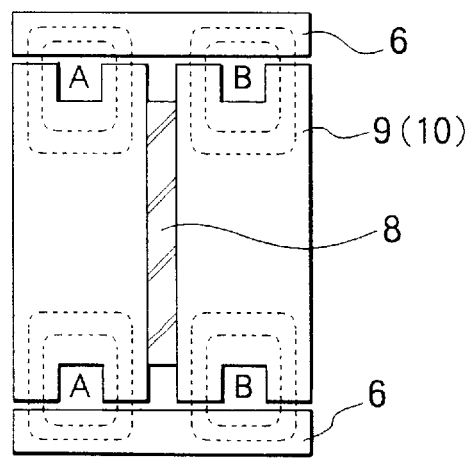
FIG. 6 is a schematic diagram illustrating the flow of magnetic flux generated by coils.
Figure 8:
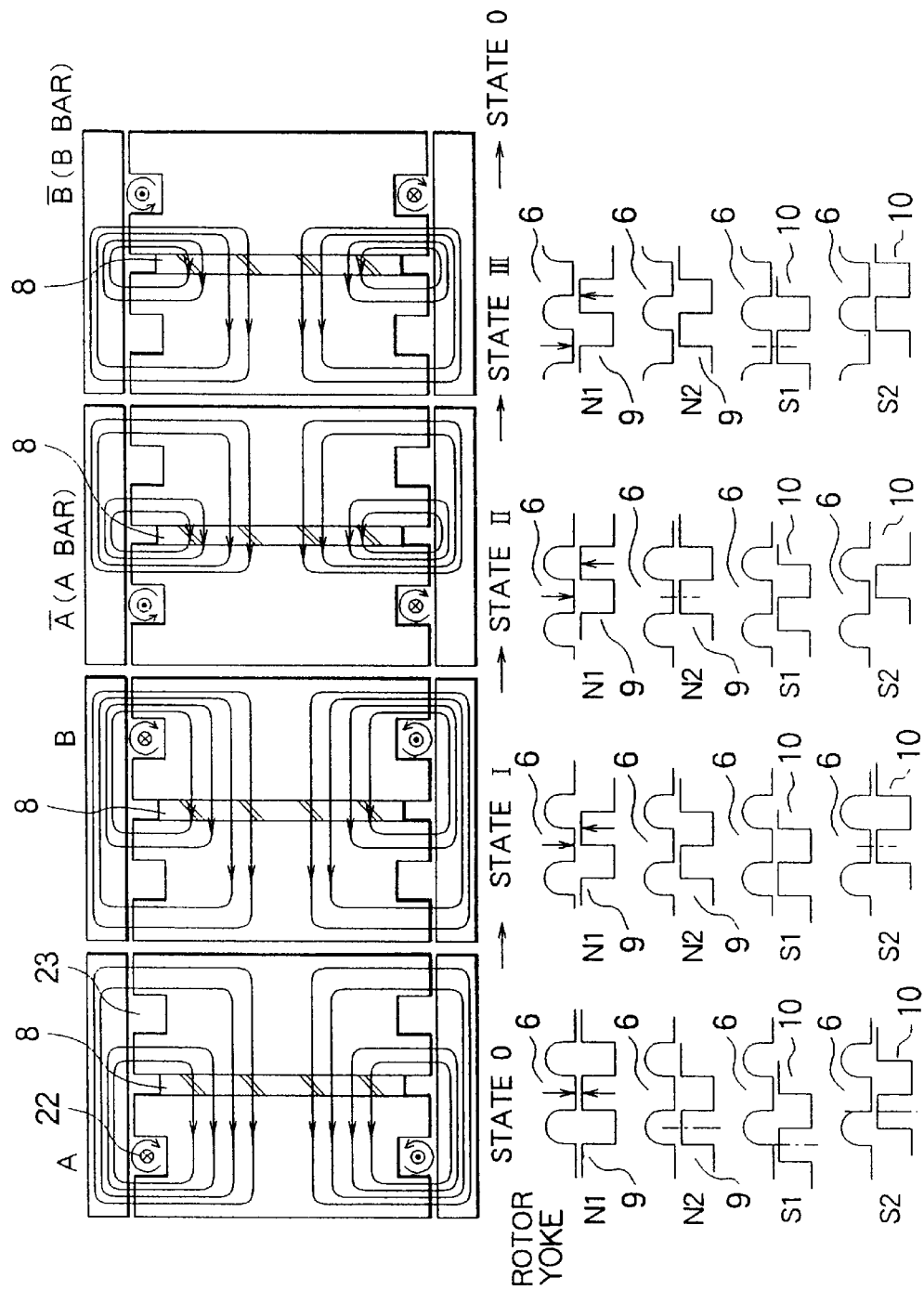
FIG. 8 is a schematic diagram illustrating the overall magnetic flux generated by magnet plates and currents flowing through coils and also illustrating the corresponding step rotation of a rotor yoke.

Now, the operation will be described below. FIG. 5 illustrates the flow of the magnetic flux generated by the magnet plate 8. FIG. 6 illustrates the magnetic flux generated by the first coil 22 and that generated by the second coil 23. The direction of the magnetic flux depends on the direction of current flowing through the coils 22 and 23. Referring now to FIG. 8, if the first and second coils 22 and 23 are driven by a driving circuit (not shown) so that an electric current is passed through the first and second coils 22 and 23 in the directions shown in "A" and "B", the rotor yoke 6 rotates in the direction from state 0 to state I owing to the magnetic force. Then the coils 22 and 23 are driven by the driving circuit in the directions shown in "OVER-LINTA" and "B̄" which are opposite to those shown in "A" and "B". The rotor yoke 6 now rotates as shown in states II and III. After that, the rotor yoke 6 comes to state 0 and thus the rotor yoke 6 has rotated by an amount corresponding to one pitch of the rotor teeth 7.

Figure 9:
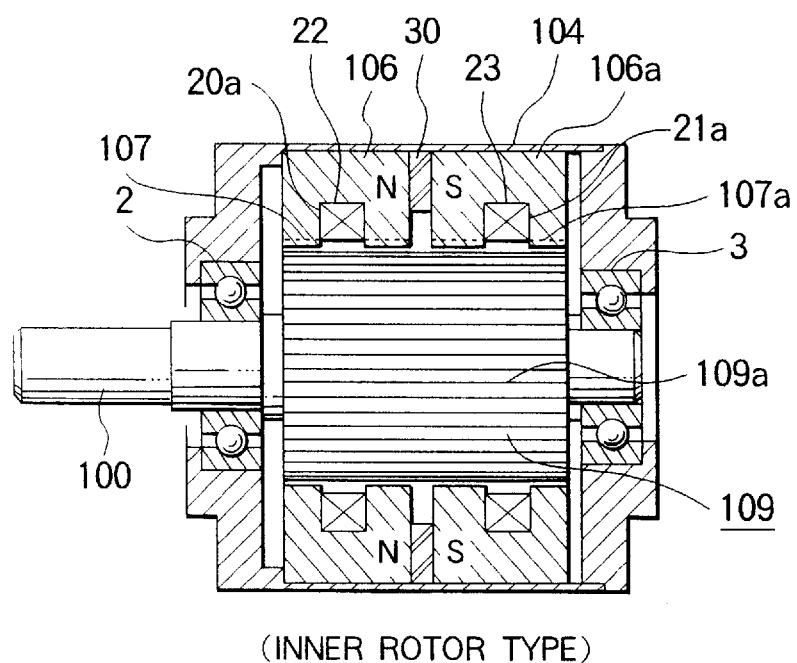
FIG. 9 is a cross-sectional view illustrating another embodiment having a structure based on FIG. 2.

FIG. 9 illustrates another embodiment of a hybrid type stepping motor according to the present invention. In this embodiment, the hybrid type stepping motor has an inner rotor structure corresponding to that of the conventional hybrid type stepping motor with an inner rotor structure shown in FIG. 1. A pair of first and second ring-shaped stator yokes 106 and 106A are formed in an integral fashion on the inner wall of a stator case 104 made of a non-magnetic material wherein the first and second stator yokes 106 and 106A are apart from each other in the axial direction via a ring-shaped magnet plate 30. The stator yokes 106 and 106A form magnetic poles with polarities different from each other. First and second coils 22 and 23 in the form of a bobbin are disposed in the coil reception slots 20a and 21a of the stator yokes 106 and 106A, respectively. A rotor yoke 109 is provided on a revolving shaft 100 made of a magnetic material, at a location corresponding to the stator yokes 106 and 106A. A plurality of rotor teeth 109a are formed on the periphery of the rotor yoke 109. As can be seen from the above description, the stepping motor shown in FIG. 9 has the inner rotor structure which is an inversion in structure of that shown in FIG. 2, and thus the stepping motor shown in FIG. 9 can rotate in a step fashion in a similar manner to that shown in FIG. 5 through FIG. 8. In this specific embodiment, although the coils 22 and 23 are of the type of bipolar winding, the coils 22 and 23 may also be of the type of unipolar winding. Furthermore, although one-phase excitation is employed in this embodiment, two-phase or one/two-phase excitation may also be employed. The above-described shifts in the locations of teeth 7, 9a, 10a, 107, and 109a may be introduced in a relative fashion and thus either side may be shifted. As in the previous embodiment, a magnet (not shown) may be disposed in each space between adjacent rotor teeth 107 and 107a and in each space between adjacent stator teeth 109a.

Figure 10:
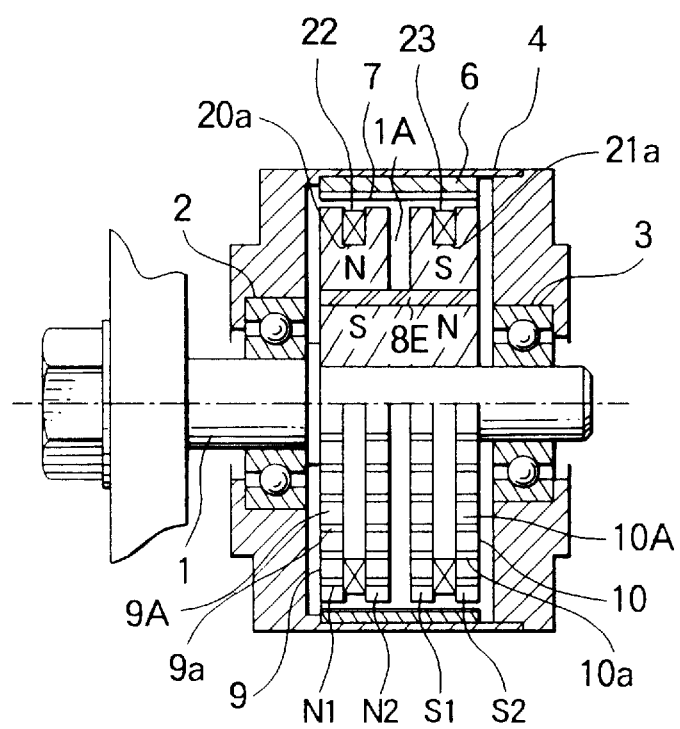
FIG. 10 is a cross-sectional view illustrating still another embodiment having a structure based on FIG. 2.

FIG. 10 illustrates another embodiment of a stepping motor based on the structure shown in FIG. 2. In FIG. 10, similar parts to those of FIG. 2 are denoted by similar reference numerals.

In FIG. 10, reference numeral 1 denotes a fixed shaft made of a magnetic material. On this fixed shaft, there is provided a pair of bearings 2 and 3 at locations spaced from each other. A rotor case 4 formed into a ring shape in general is disposed on the fixed shaft via the pair of bearings 2 and 3 in such a manner that the rotor case 4 can freely rotate. On the inner wall of this rotor case 4, there is disposed a ring-shaped rotor yoke 6 having a plurality of rotor teeth 7.

A magnet cylinder 8E is disposed on the fixed shaft 1. On this magnet cylinder 8E, there are provided first and second ring-shaped stator yokes 9 and 10 which are apart from each other via a space 1A in the axial direction and disposed in parallel to each other wherein the first and second ring-shaped stator yokes 9 and 10 are fitted in an integral fashion on the periphery of the magnet cylinder 8E.

First and second coil reception slots 20a and 21a are formed on the periphery of the respective stator yokes 9 and 10, at the center in the axial direction of each stator yoke 9, 10. A first coil 22 and a second coil 23, which are wound into the form of a bobbin using for example an automated winding machine, are disposed in the respective coil reception slots 20a and 21a. First and second north poles N1 and N2 are formed on the periphery of the first stator yoke 9 in such a manner that the first coil 22 is located between the first and second north poles N1 and N2. First and second south poles S1 and S2 are formed on the periphery of the second stator yoke 10 in such a manner that the second coil 22 is located between the first and second south poles S1 and S2. These poles N1, N2, S1, and S2 correspond to the respective rotor teeth 7. A plurality of stator teeth 9a and 10a are formed on the periphery of the poles N1, N2, S1, and S2 in such a manner that the pitch of the stator teeth 9a and 10a is equal to that of the rotor teeth 7. In the north poles N1 and N2, stator teeth 9a and 10a are formed in such a manner that the locations of the teeth on the pole N1 are shifted by an amount of ½ pitch relative to the locations of the teeth on the pole N2. Similarly, in the south poles S1 and S2, the locations of the teeth on the pole S1 are shifted by an amount of ½ pitch relative to the locations of the teeth on the pole S2. The locations of the stator teeth 9a and 10a of the north poles N1 and N2 are shifted by an amount of ¼ pitch relative to the locations of the teeth of the south poles S1 and S2, respectively.

Also in this embodiment shown in FIG. 10, as in the previous embodiment described above with reference to FIG. 2, magnets 7A, 9A, and 10A may be disposed in such a manner that a magnet is located either in each space between rotor teeth 7 or in each space between stator teeth 9a and 10a or otherwise may be disposed in such a manner that a magnet is located in each space between rotor teeth 7 and also in each space between stator teeth 9a and 10a.

Figure 11:
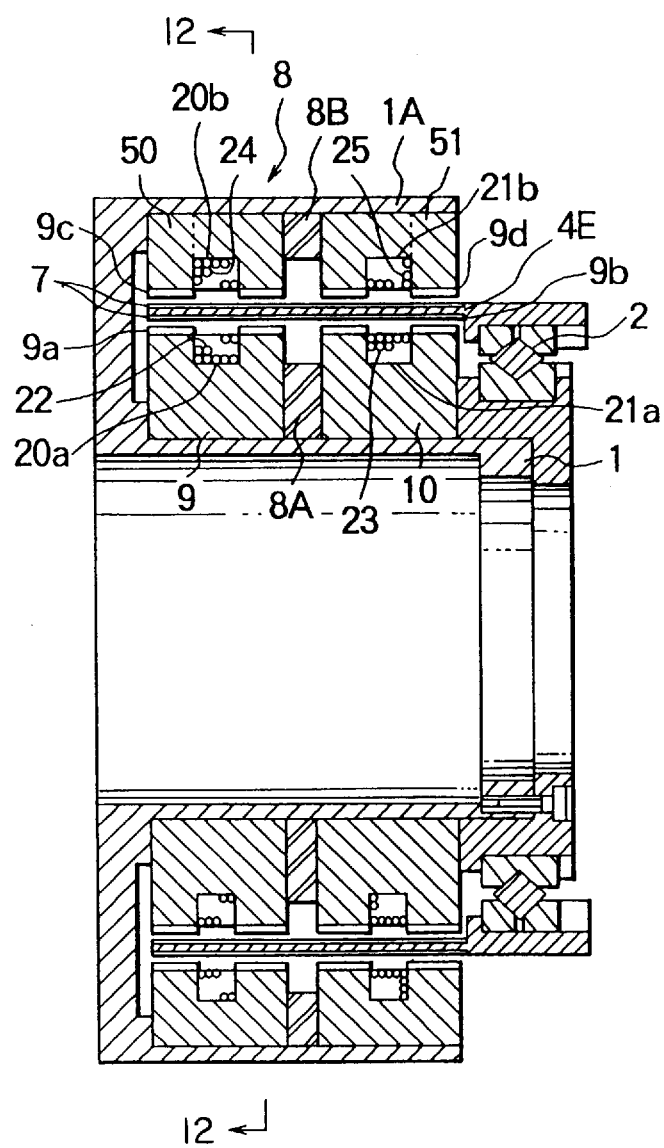
FIG. 11 is a cross-sectional view illustrating a further embodiment having a structure based on FIG. 2.
Figure 12B:
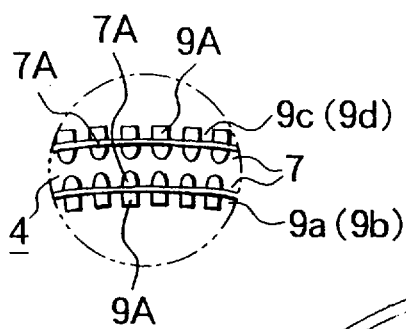
FIG. 12 a cross-sectional view taken along line Y–Y' of FIG. 11.
Figure 12A:
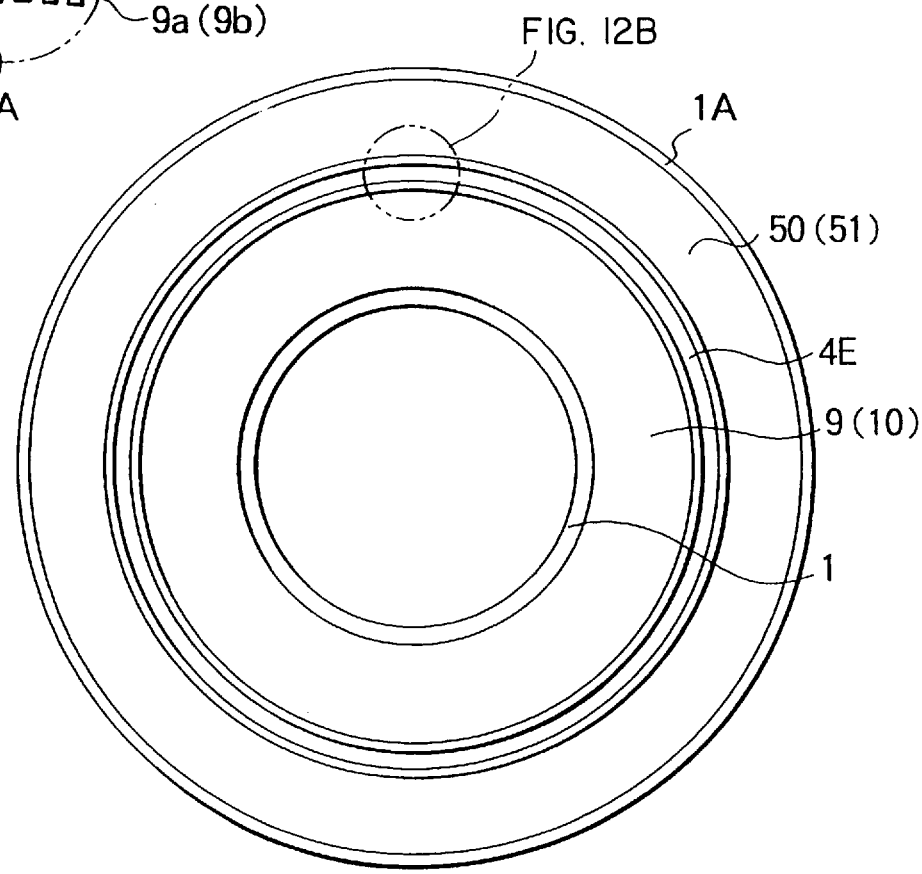

With reference to FIGS. 11 and 12, still another embodiment of a stepping motor having a structure based on that shown in FIG. 2 will be described below. In FIGS. 11 and 12, similar parts to those of FIG. 2 are denoted by similar reference numerals.

In FIG. 11, reference numeral 1 denotes a fixed shaft in the form of a hollow cylinder made of a non-magnetic material. A cylindrical rotor 4E formed into a ring shape in general is disposed via a bearing 2 on the fixed shaft in such a manner that the cylindrical rotor 4E can freely rotate. As shown in FIG. 11, a plurality of rotor teeth 7 are formed on the inner and outer walls of the rotor 4E.

On the fixed shaft 1, there are provided first and second ring-shaped inner stator yokes 9, 10 formed in an integral fashion at parallel locations apart from each other in the axial direction via magnet plates 8 consisting of first and second magnets 8A and 8B. First and second coil reception slots 20a and 21a are formed on the periphery of the respective stator yokes 9 and 10, at the center in the axial direction of each stator yoke 9, 10. A first coil 22 and a second coil 23 wound into the form of a bobbin are disposed in the respective coil reception slots 20a and 21a (each coil 22, 23 is wound using an automated winding machine). First and second north poles N1 and N2 are formed on the periphery of the first stator yoke 9 in such a manner that the first coil 22 is located between the first and second north poles N1 and N2. First and second south poles Si and S2 are formed on the periphery of the second stator yoke 10 in such a manner that the second coil 23 is located between the first and second south poles S1 and S2. These poles N1, N2, S1, and S2 correspond to the respective rotor teeth 7. A plurality of stator teeth 9a and 10a are formed on the periphery of the poles N1, N2, S1, and S2 in such a manner that the pitch of the stator teeth 9a and 10a is equal to that of the rotor teeth 7. In the north poles N1 and N2, stator teeth 9a and 10a are formed in such a manner that the locations of the teeth on the pole N1 are shifted by an amount of ½ pitch relative to the locations of the teeth on the pole N2. Similarly, in the south poles S1 and S2, the locations of the teeth on the pole S1 are shifted by an amount of ½ pitch relative to the locations of the teeth on the pole S2. The locations of the stator teeth 9a and 10a of the north poles N1 and N2 are shifted by an amount of ¼ pitch relative to the locations of the teeth of the south poles S1 and S2, respectively.

The fixed shaft 1 has an outer shell 1A with an L-shape in cross section, located at an peripheral position. First and second outer stator yokes 50 and 51 similar to the inner stator yokes 9 and 10 are disposed on the inner wall of the outer shell 1A. As in the inner stator yokes 9 and 10, third and fourth coil reception slots 20b and 21b, third and fourth coils 24 and 25, and stator tooth 9c and 9d are formed on the inner wall of the outer stator yokes 50 and 51.

As can be seen from the above description, also in this embodiment shown in FIGS. 11 and 12 as in the previous embodiment described above with reference to FIG. 2, magnets 7A, 9A, and 10A may be disposed in such a manner that a magnet is located either in each space between rotor teeth 7 or in each space between stator teeth 9a and 10a or otherwise may be disposed in such a manner that a magnet is located in each space between rotor teeth 7 and also in each space between stator teeth 9a and 10a.

With reference to FIGS. 13 to 20, further embodiments of a stepping motor having a structure based on that shown in FIG. 2 will be described below. In FIGS. 13 to 20, similar parts to those of FIG. 2 are denoted by similar reference numerals.

Figure 13:
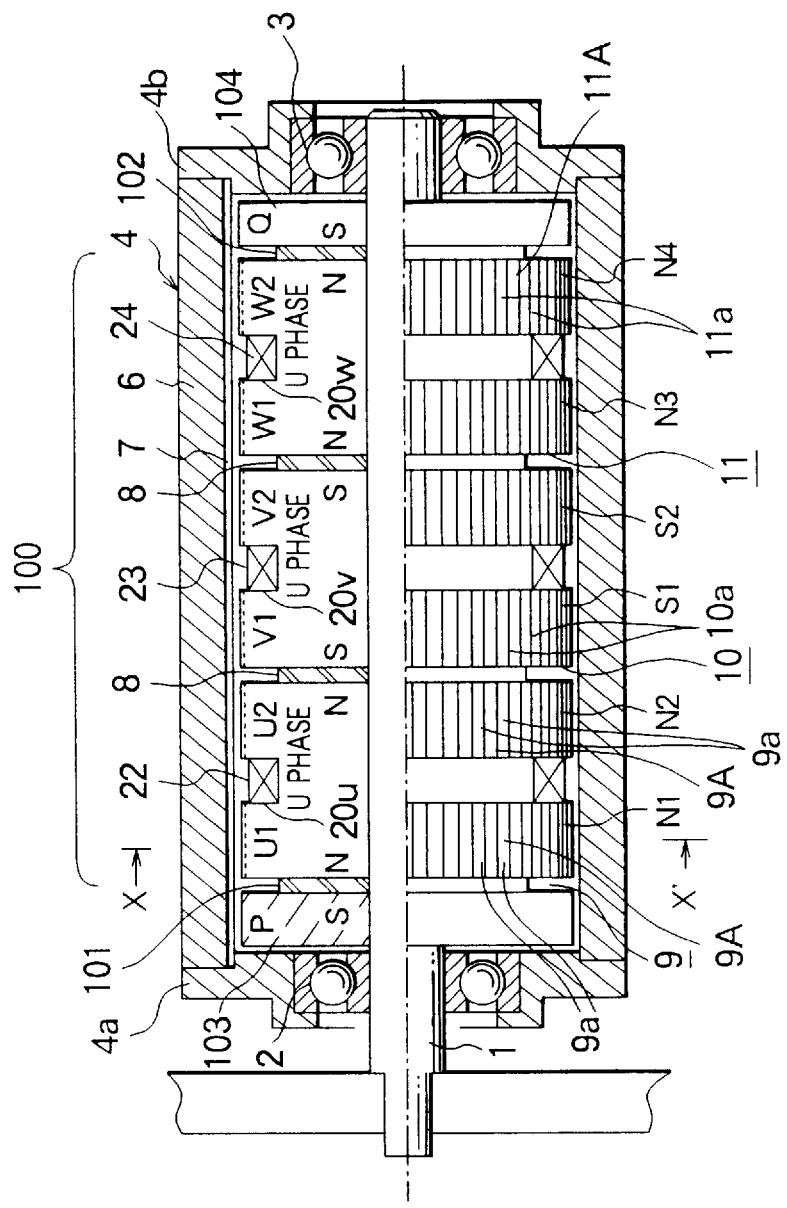
FIG. 13 is a half cross-sectional view illustrating another embodiment having a structure based on FIG. 2.

FIG. 13 illustrates a hybrid type stepping motor with an outer-rotor structure. In this figure, reference numeral 1 denotes a fixed shaft made of a non-magnetic material. On this fixed shaft, there is provided a pair of bearings 2 and 3 spaced from each other. A rotor case 4 including a front cover 4a, a rear cover 4b, and a cylindrical rotor yoke 6 is disposed on the fixed shaft via the pair of bearings 2 and 3 in such a manner that the rotor case 4 can freely rotate. A plurality of rotor teeth 7 are formed on the inner wall of the rotor yoke 6 of the rotor case 4.

Figure 18:
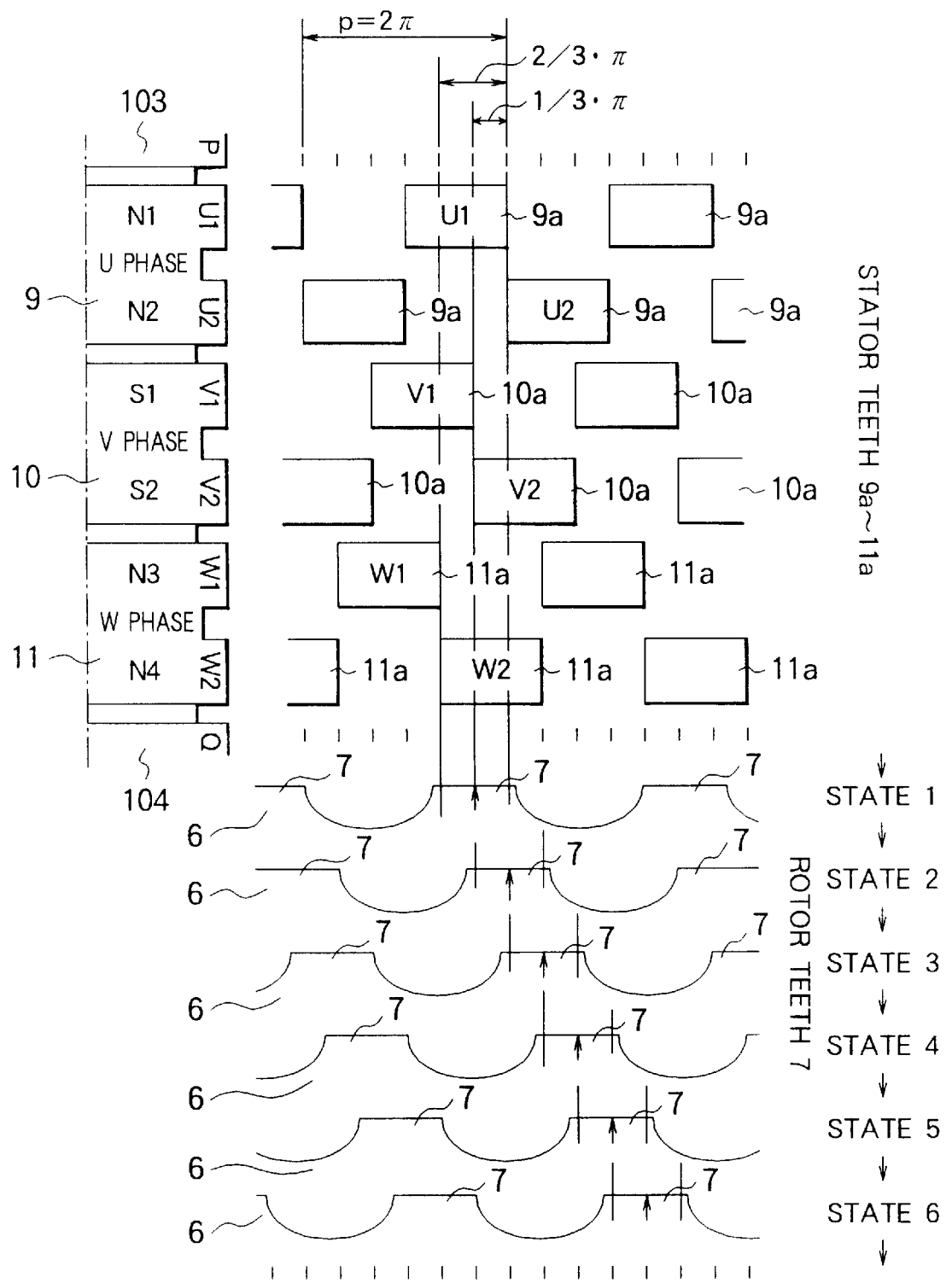
FIG. 18 is a schematic illustration of the operation of step-driving the stepping motor shown in FIG. 13 for each state of the operation.

On the fixed shaft 1, there are provided first, second and third ring-shaped stator yokes 9, 10, and 11 disposed in an integral fashion at parallel locations apart from each other via a magnet plate 8 in the axial direction. First, second and third coil reception slots 20u, 20v and 21w are formed on the periphery of the respective stator yokes 9, 10 and 11, at the center in the axial direction of each stator yoke 9, 10, 11. The stator yokes 9–11 constitute a set of yokes 100. First and second auxiliary magnetic plates 103 and 104 are fixed on the fixed shaft 1 via auxiliary magnet plates 101 and 102, respectively, at either end of the set of stator yokes 100. A first U-phase coil 22 and second V-phase coil 23 and third W-phase coil 24 each wound into the form of a bobbin are disposed in the coil reception slots 20u, 20v and 20w, respectively (these coils 22, 23 and 24 are wound using an automated winding machine). First and second north poles N1 and N2 are formed on the periphery of the first stator yoke 9 in such a manner that the first coil 22 is located between the first and second north poles N1 and N2. First and second south poles S1 and S2 are formed on the periphery of the second stator yoke 10 in such a manner that the second coil 23 is located between the first and second south poles S1 and S2. Similarly, third and fourth north poles N3 and N4 are formed on the periphery of the third stator yoke 11 in such a manner that the third coil 24 is located between the third and fourth north poles N3 and N4. The respective poles N1, N2, S1, S2, N3, and N4 are arranged in such a manner as to correspond to the rotor teeth 7. A plurality of stator teeth 9a, 10a and 11a having the same pitch as that of the rotor teeth 7 are formed on the periphery of each pole N1, N2, S1, S2, N3 and N4. In the poles N1 and N2, as shown in FIG. 18, stator teeth 9a, 10a and 11a are formed in such a manner that the locations of the teeth on the pole N1 are shifted by an amount of ½ pitch (1π) relative to the locations of the teeth on the pole N2. Similarly, the locations of the teeth on the pole S1 are shifted by an amount of ½ pitch (1π) relative to the locations of the teeth on the pole S2. Furthermore, the stator teeth 9a, 10a, 11a are formed at locations so that there is a shift of ⅙ pitch (=½n pitch wherein n is the number of phases, or π/3 in this case) between those on the north poles N1, N2 and the south poles S1, S2, and there is also a shift of ⅙ pitch between those on the south poles S1, S2 and the north poles N3, N4. The auxiliary magnetic plates 103 and 104 serve to provide a path of magnetic flux.

Figure 14:
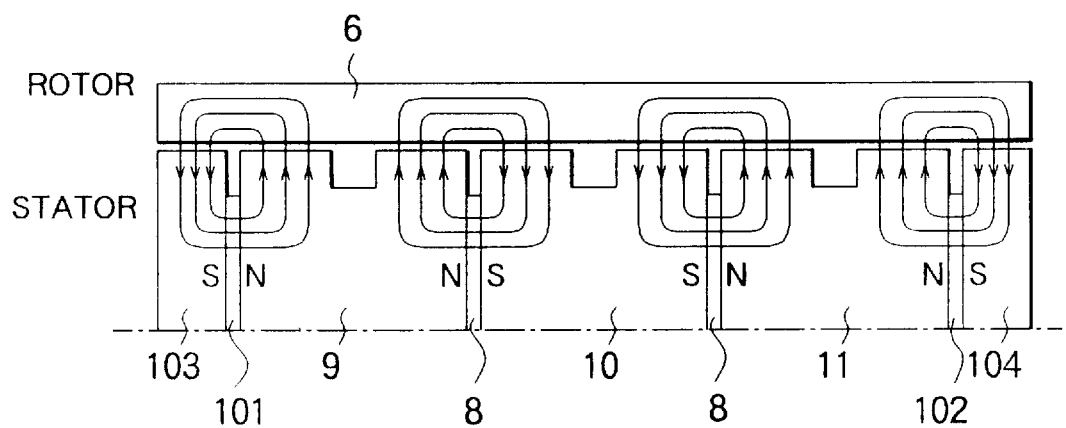
FIG. 14 is a schematic diagram illustrating the flow of magnetic flux generated by each magnet plate shown in FIG. 13.
Figure 15:
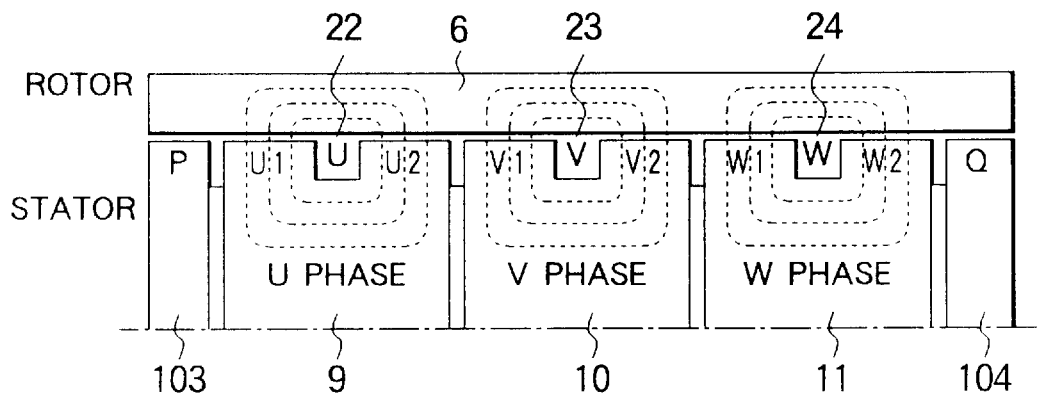
FIG. 15 is a schematic diagram illustrating the flow of magnetic flux generated by coils shown in FIG. 13.

Now, the operation will be described below. FIG. 14 illustrates the magnetic flux generated by the magnet plate 8 and the auxiliary magnet plates 101 and 102. FIG. 14 also shows auxiliary magnet plates 103 and 104 which cause the magnetic flux to be equally divided. If the auxiliary magnet plates 101, 102 and auxiliary magnetic plates 103, 104 are not provided, then the magnetic flux generated by the two magnets 8 will tend to be concentrated within the V-phase stator yoke 10 at the center and thus the magnetic flux density in the V-phase stator yoke 10 will become greater than those in the U-phase and W-phase yokes at either side of the V-phase stator yoke 10. As a result, ununiformity occurs in the distribution of the magnetic flux among three phases, and thus a proper motor operation is no longer achieved. As described above, the auxiliary magnet plates and auxiliary magnetic plates play an important role to achieve a great magnetic flux with good uniformity. FIG. 15 shows the magnetic flux generated by coils 22, 23 and 24 of phases U, V and W wherein the direction of the magnetic flux varies depending on the direction of the current flowing through the coils 22, 23 and 24.

Figure 16:
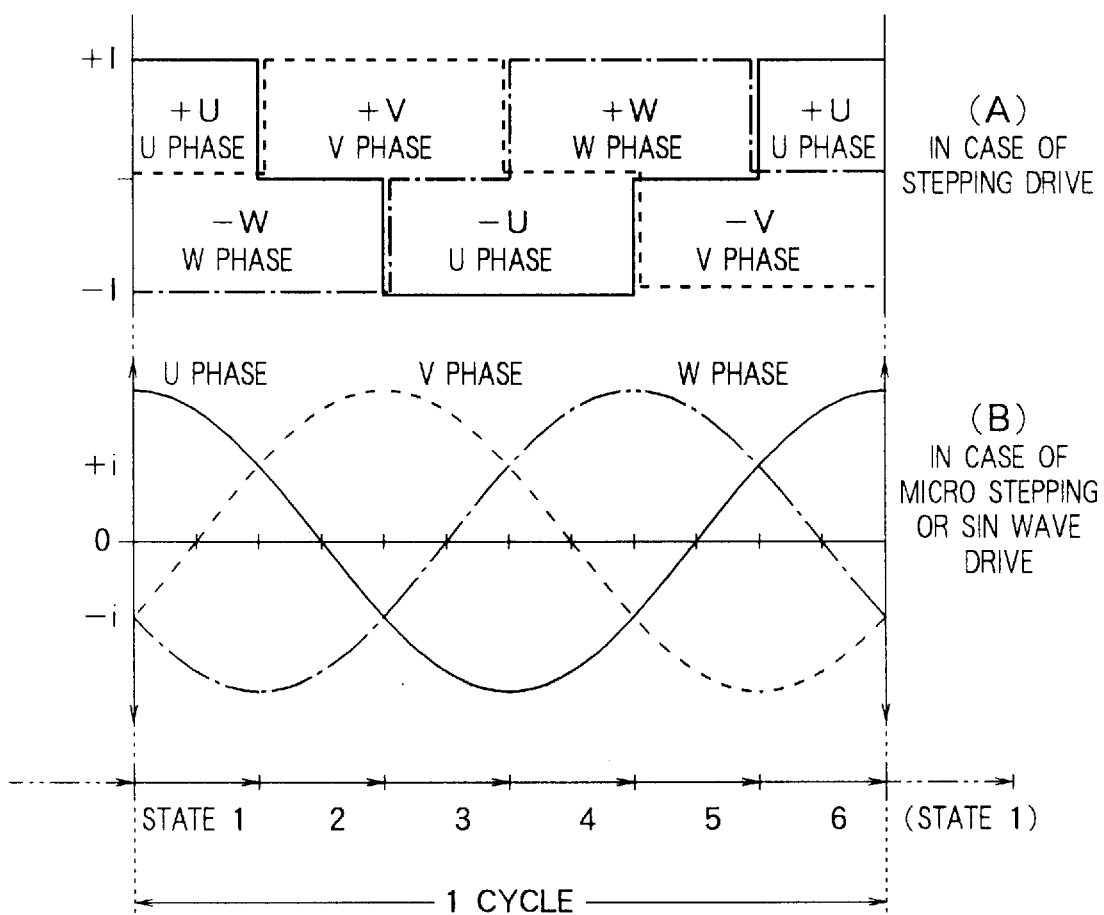
FIG. 16 is a schematic illustration of the operation of driving the stepping motor shown in FIG. 13.

FIG. 16 illustrates some specific examples of currents flowing through the coils 22, 23, and 24. In the example shown in FIG. 16A, the coils are driven in a step fashion so that the driving current with a constant magnitude is abruptly turned on and off. On the other hand, in the case of FIG. 16B, the current is gradually changed according to the well-known micro-step method or changed in a sinusoidal fashion. In each case, one cycle is divided into six states (states 1 through 6) which will be described in further detail below in conjunction with FIG. 17.

Figure 17:
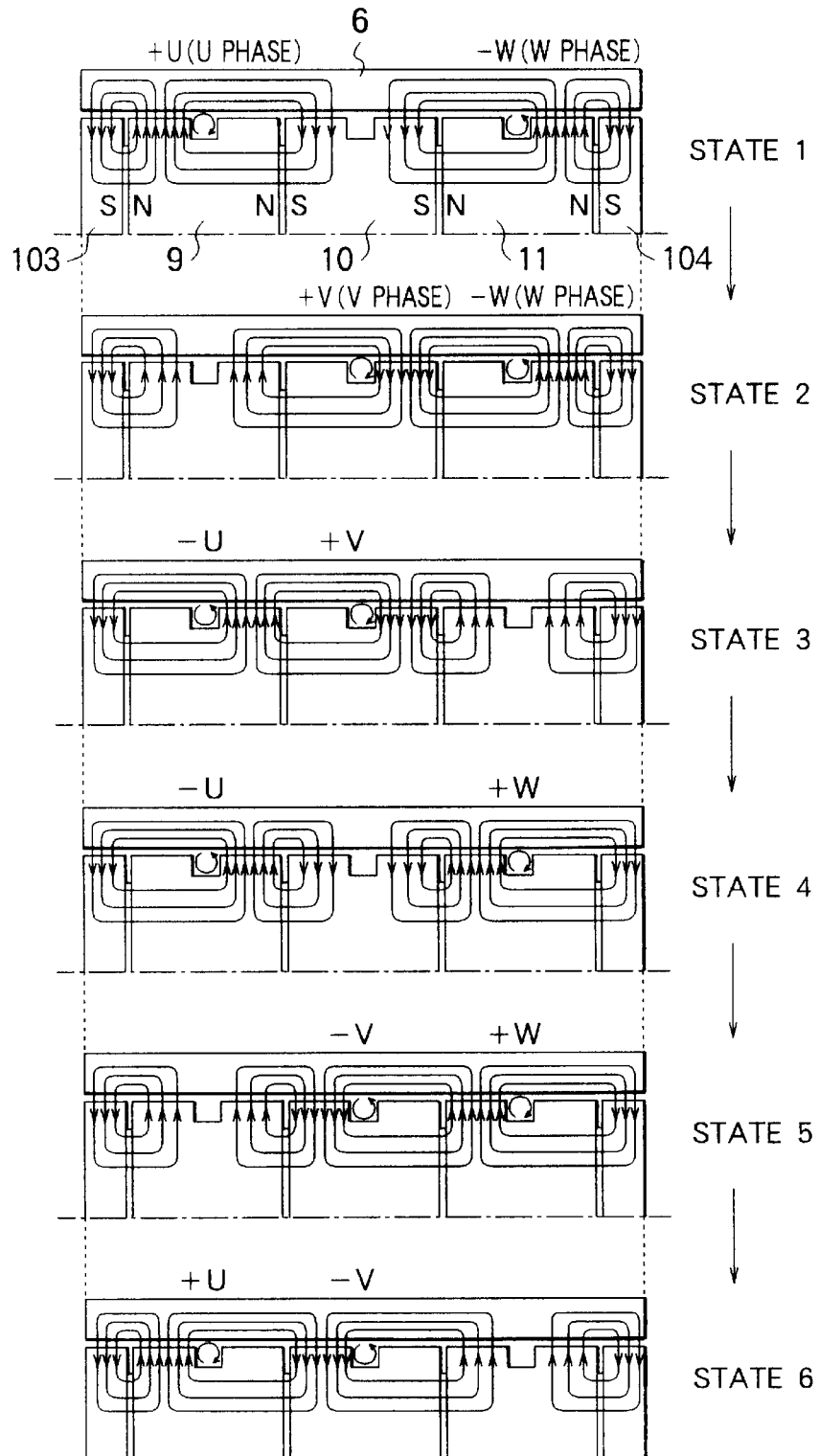
FIG. 17 is a schematic illustration of the operation of step-driving the stepping motor shown in FIG. 13 for each state of the operation.

FIG. 17 illustrates the overall magnetic flux generated by the magnet plate 8, the auxiliary magnet plates 101 and 102 and the current which flows in each driving state 1 through 6 for the two driving modes: the step driving mode shown in FIG. 16A and the micro-step driving mode or sinusoidal driving mode shown in FIG. 16B. Also in this case, as can be seen from FIG. 17, the auxiliary magnetic plates 103 and 104 and the auxiliary magnet plates 101 and 102 according to the present invention play an important role to obtain uniform distribution of the overall magnetic flux.

FIG. 18 shows the locations of the rotor teeth 7 relative to the locations of the stator teeth 9a, 10a, and 11a, in relation to FIG. 17. As shown in FIG. 18, the rotor teeth 7 move in location systematically in response to each state 1 through 6. In this three-phase motor, as described above, the auxiliary magnetic plates 103 and 104 disposed at either side of the set of stator yokes 100 and the auxiliary magnet plates 101 and 102 are essential to achieve the motor operation.

Figure 19:
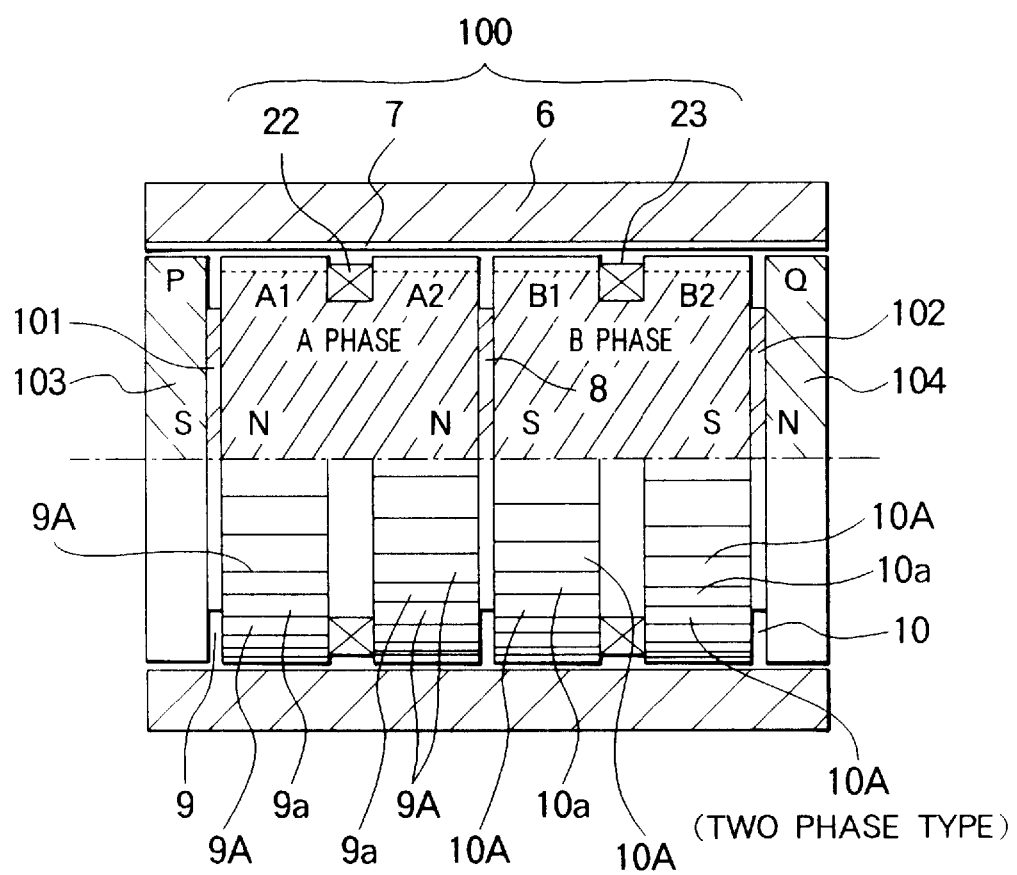
FIG. 19 is a half cross-sectional view illustrating a 2-phase type stepping motor based on the structure shown in FIG. 13.

FIG. 19 illustrates a two-phase stepping motor having a structure similar to that shown in FIG. 13.

In the stator yokes 9 and 10 of this two-phase structure, there is a shift of ½ pitch between A1 and A2 and also between B1 and B2. Furthermore, there is a shift of ½n or ¼ pitch between phase A and phase B. Although in the case of the two-phase motor, the auxiliary magnet plates 101 and 102 and the auxiliary magnetic plates 103 and 104 are not necessarily required, these elements are also useful even in the two-phase motor in the sense that the auxiliary magnets 101 and 102 located at either side of the stator yokes 9 and 10 allow the stator yokes 9 and 10 to be excited uniformly, which results in a great output torque with less irregularity.

Figure 20:
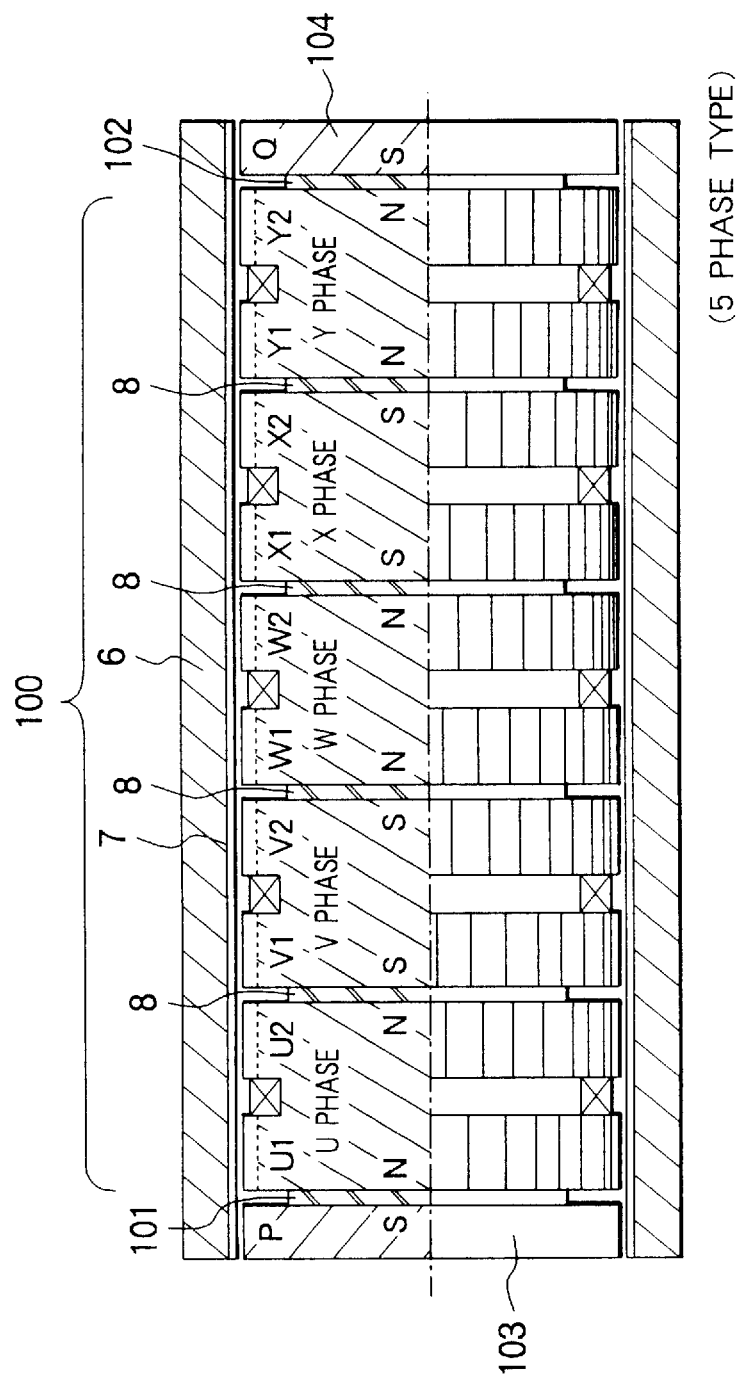
FIG. 20 is a half cross-sectional view illustrating a 5-phase type stepping motor based on the structure shown in FIG. 13.

In the example shown in FIG. 20, the above structure is used to realize a 5-phase stepping motor. In each phase U, V, W, X, and Y, there is a shift of ½ pitch between U1 and U2, between V1 and V2, between W1 and W2, between X1 and X2, and between Y1 and Y2. On the other hand, there is a phase-to-phase shift equal to ½n=1/10 pitch.

As described above with reference to FIGS. 13 to 20, the present invention may be applied to a stepping motor with phases from 2 to n whatever they are odd or even.

Figure 21:
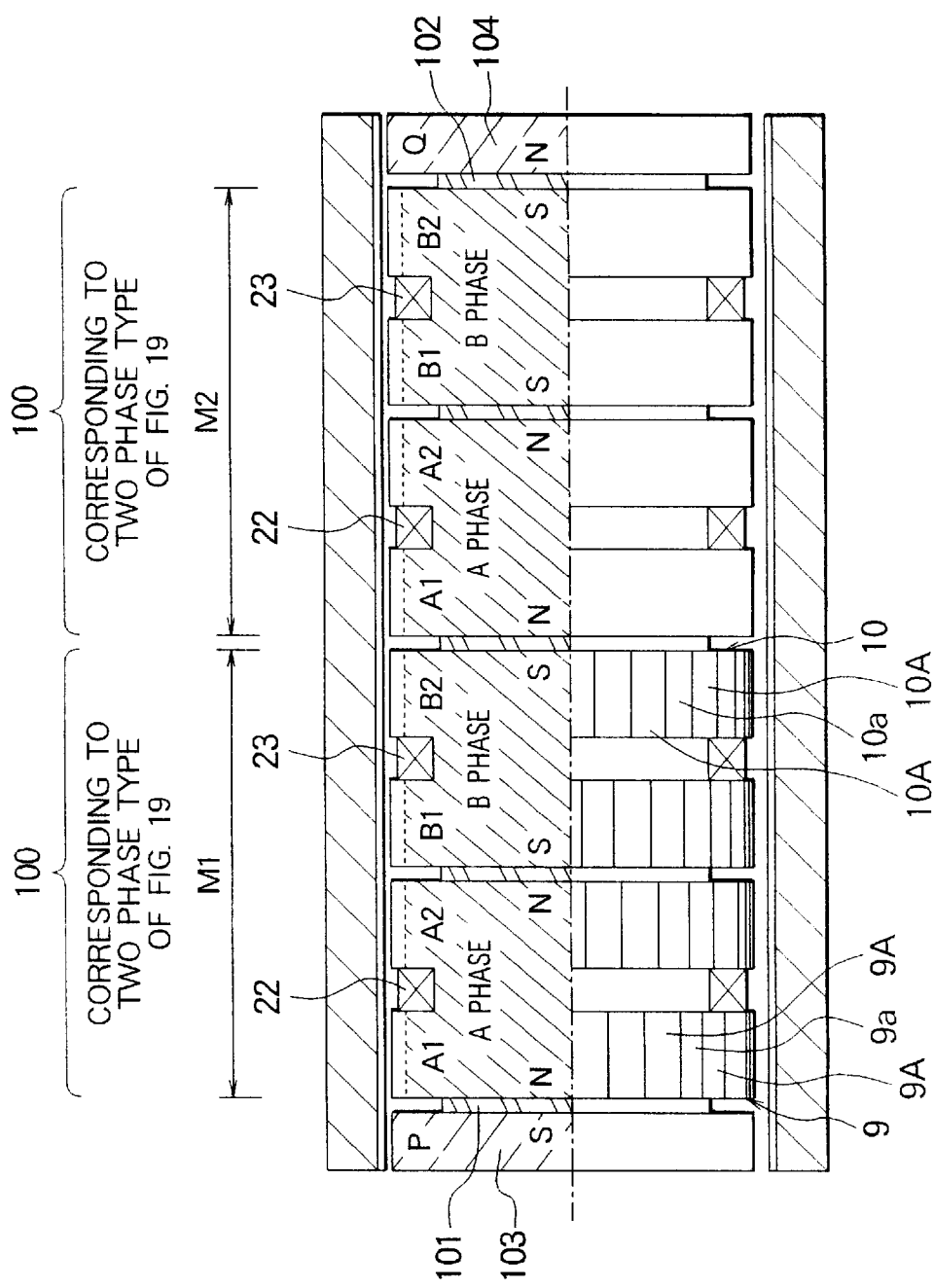
FIG. 21 is a half cross-sectional view of a combined construction including two cascaded 2-phase stepping motors of the type shown in FIG. 19.

In another embodiment shown in FIG. 21, two 2-phase motors (M1 and M2) shown in FIG. 19 are combined into a cascaded fashion. That is, in this cascaded construction shown in FIG. 21, two sets of stator yokes 100 of the type shown in FIG. 19 are combined into a single form via a magnet plate 8 wherein auxiliary magnet plates 101 and 102 and auxiliary magnetic plates 103 and 104 are disposed at either end of the overall structure in a similar manner to the structure shown in FIG. 19. Furthermore, plural sets of stator yokes 100 as many as N sets may be combined into a single form in a similar manner so as to realize a hybrid stepping motor with either an outer or inner rotor structure having as many cascaded sets of stator yokes 100 as desired. Also in this structure, unlike the construction obtained simply by combining two separate motors M1 and M2 via the coaxial shaft, the magnet 8 disposed between the units M1 and M2 and the auxiliary magnets 101 and 102 and also the auxiliary magnetic plates 103 and 104 play an important role similar to the structure shown in FIG. 13.

Although in the specific embodiment described above with reference to FIG. 21, a plurality of 2-phase motors of the type shown in FIG. 19 are used to obtain a combined construction, motors of the type shown in FIG. 13 or 20 or otherwise of the type which will be described later with reference to FIG. 22 may also be employed. In general, a plurality of n-phase motors as many as N may be combined into a cascaded fashion so as to achieve a greater torque as required.

Figure 22:
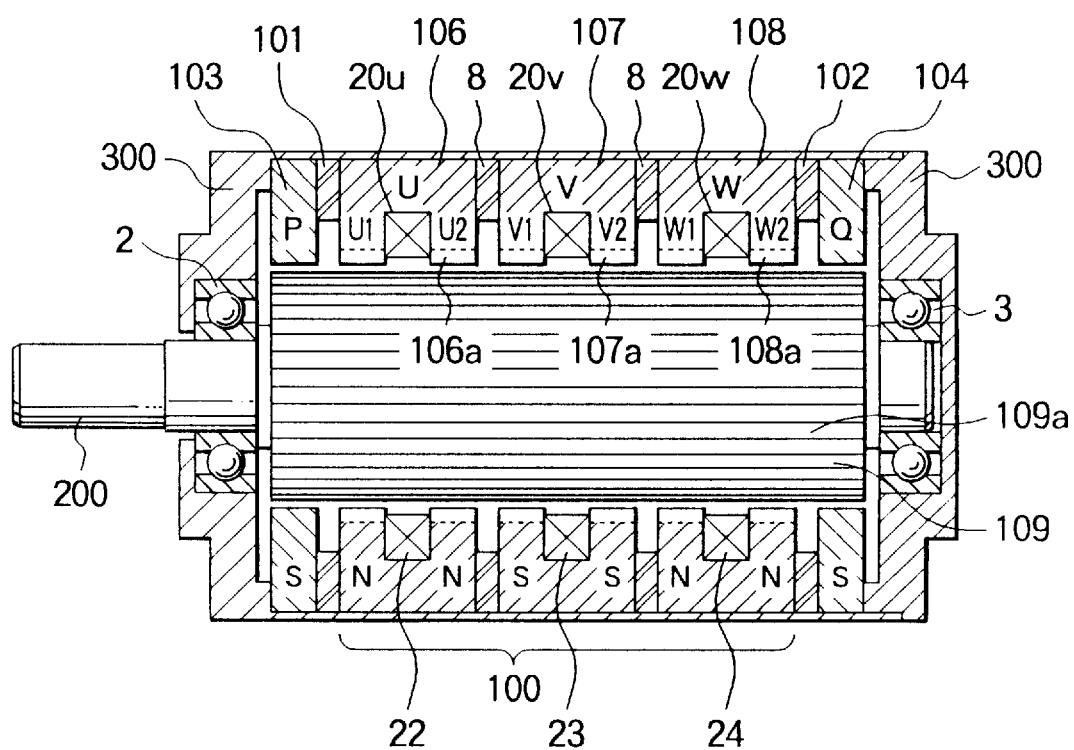
FIG. 22 is a cross-sectional view illustrating another embodiment based on the structure of FIG. 13.

In an embodiment shown in FIG. 22 the conventional hybrid type stepping motor with an inner rotor structure shown in FIG. 1 is modified in such a manner as to construct a hybrid type stepping motor with an inner rotor structure according to the present invention. On the inner wall of a stator case 300 made of a non-magnetic material, there are provided first, second and third ring-shaped stator yokes 106, 107 and 108 disposed at parallel locations apart in the axial direction via a ring-shaped magnet plate 8 located between adjacent stator yokes wherein they are formed in an integral fashion so as to construct a 3-phase stator yoke set 100. The respective stator yokes 106, 107 and 108 form magnetic poles with polarities different from each other.

Furthermore, auxiliary magnets 101, 102 and auxiliary magnetic plates 103, 104 are disposed at either side of the set of stator yokes 100 thereby forming a magnetic circuit at either end. First, second and third coils 22, 23 and 24 in the form of a bobbin are disposed in coil reception slots 20*u*, 20*v*, and 20*w* of the ring-shaped stator yokes 106, 107, and 108, respectively. On a revolving shaft 200 made of a magnetic material, there is provided a rotor yoke 109 corresponding to three sets of stator yokes 106, 107, and 108. A plurality of rotor teeth 109*a* are formed on the periphery of the rotor yoke 109. As can be seen from the above description, the embodiment shown in FIG. 22 employs an inner rotor structure which is an invert of that shown in FIG. 13, and thus it can be driven in a step fashion according to the same manner as the operation shown in FIGS. 14 to 18.

The method employed to achieve the construction shown in FIG. 22 may also be used to realize a 2-phase inner rotor type stepping motor corresponding to FIG. 19 and a 5-phase inner rotor type stepping motor corresponding to FIG. 21, and, furthermore, may be generally employed to an n-phase inner rotor type stepping motor.

In the previous embodiment, a plurality of units having the structure shown in FIG. 19 are combined in a cascaded fashion to obtain the structure shown in FIG. 21. In general, a plurality of units each having an n-phase inner rotor structure may also be cascaded into the structure shown in FIG. 21. In these specific embodiments, although the coils 22 and 23 are of the type of bipolar winding, the coils 22 and 23 may also be of the type of unipolar winding. Furthermore, although one-phase excitation is employed in the above embodiments, two-phase or one/two-phase excitation may also be employed. The above-described shifts in the locations of teeth 7, 9*a*, 10*a*, 107, and 109*a* may be introduced in a relative fashion and thus either side may be shifted. Furthermore, the motor may be formed into various shapes such as a thin, thin and large diameter, thin and long shape, etc. Also in the embodiments shown in FIGS. 13–21, magnets 7A, 9A, 10A and 11A may be disposed in such a manner that a magnet is located either in each space between rotor teeth 7 or in each space between stator teeth 9*a*, 10*a* and 11*a* or otherwise may be disposed in such a manner that a magnet is located in each space between rotor teeth 7 and also in each space between stator teeth 9*a*, 10*a* and 11*a*. Similarly, in the case of the structure shown in FIG. 22, magnets may be disposed in the spaces between rotor teeth 106*a*, 107*a*, and 108*a* and between stator teeth 109*a*.

Figure 23:
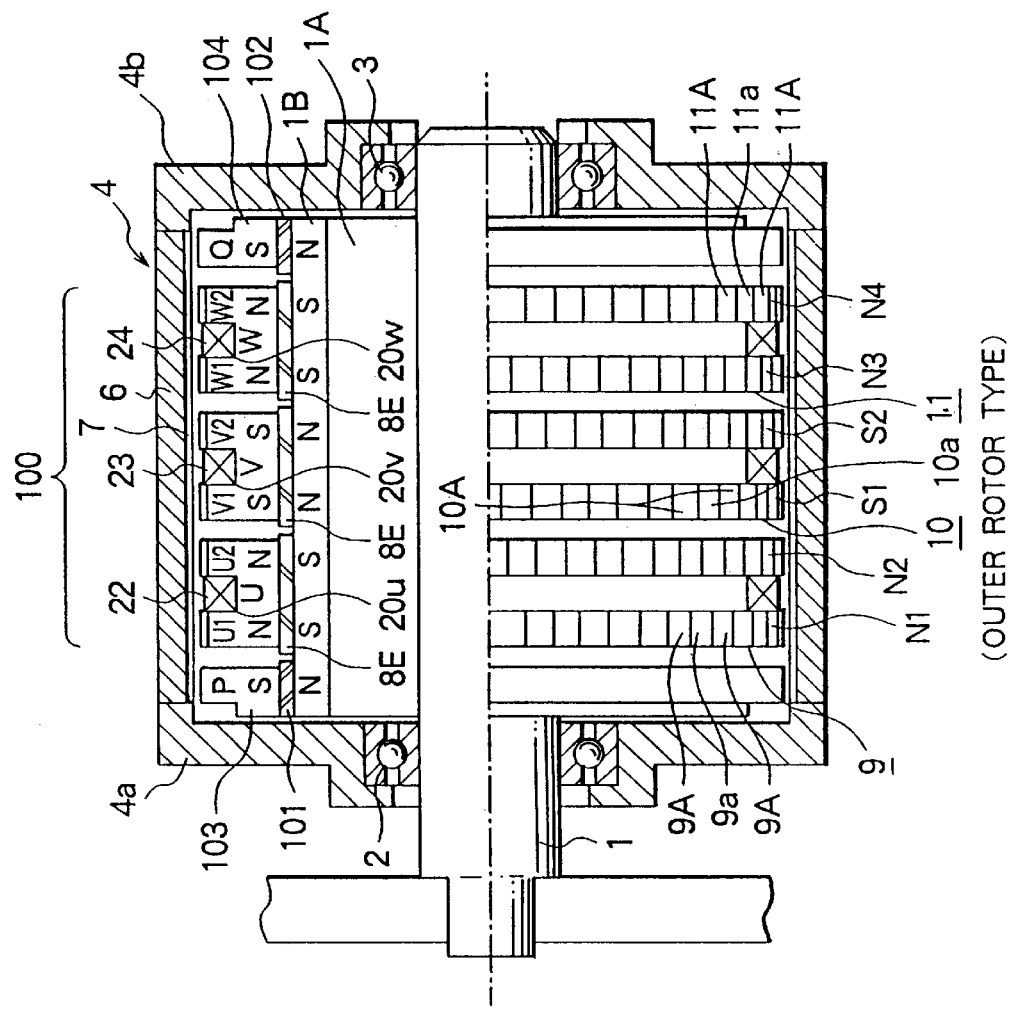
FIG. 23 is a half cross-sectional view illustrating still another embodiment based on the structure of FIG. 13.
Figure 32:
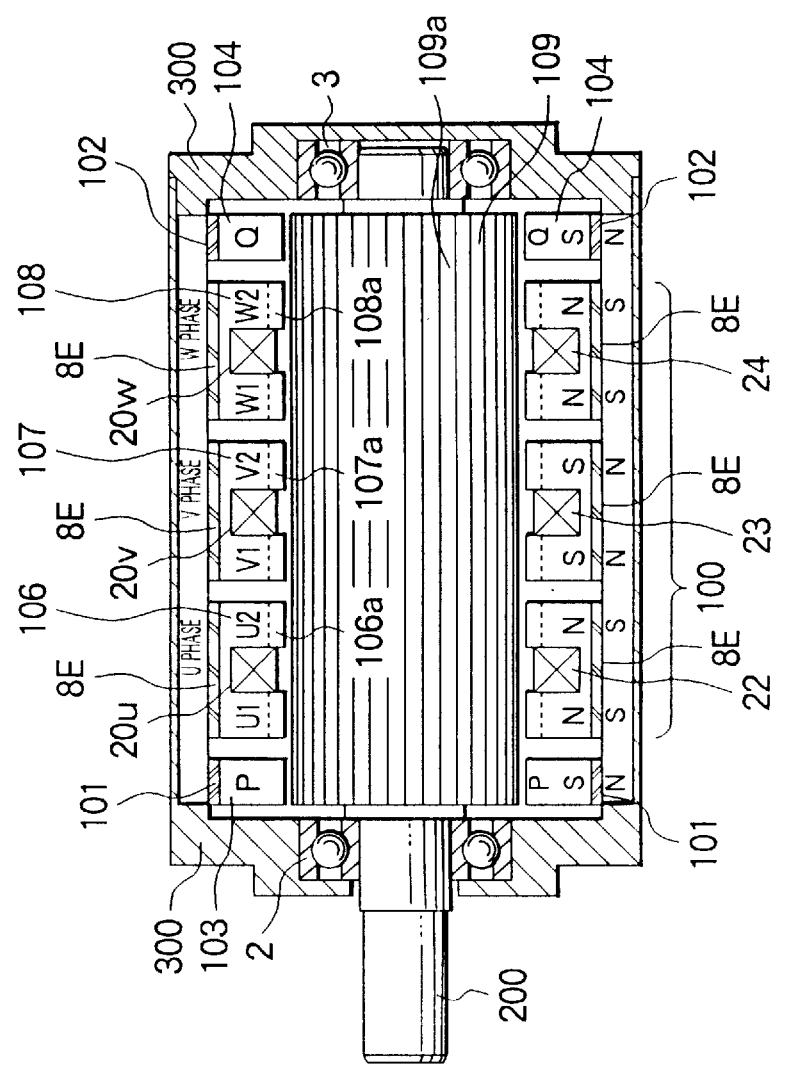
FIG. 32 is a cross-sectional view illustrating another embodiment based on the structure of FIG. 23.

With reference to FIGS. 23 and 32, further embodiments based on the structure shown in FIG. 2 will be described below. In these figures, similar parts to those in FIG. 2 are denoted by similar reference numerals.

FIG. 23 shows a hybrid type stepping motor with an outer-rotor structure. In FIG. 23, reference numeral 1 denotes a fixed shaft. On this fixed shaft, there is provided a pair of bearings 2 and 3 at locations spaced from each other. A rotor case 4 including a front cover 4*a*, a rear cover 4*b*, and a cylindrical rotor yoke 6 is disposed on the fixed shaft via the pair of bearings 2 and 3 in such a manner that the rotor case 4 can freely rotate. A plurality of rotor teeth 7 are formed on the inner wall of the rotor yoke 6 of the rotor case 4.

Figure 28:
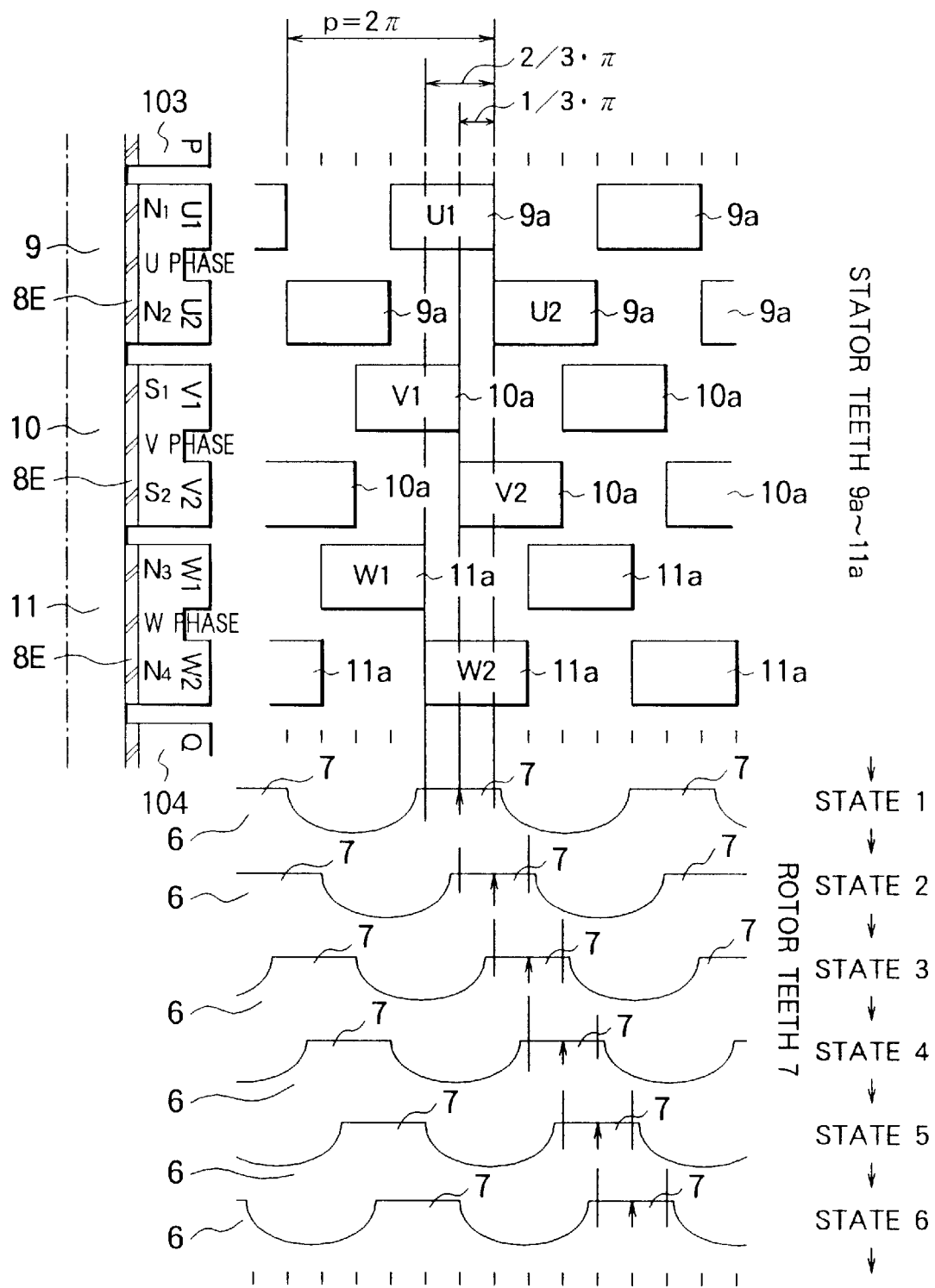
FIG. 28 is a schematic illustration of the operation of step-driving the stepping motor shown in FIG. 23 for each state of the operation.

A fixed-shaft supporting member 1A is disposed on the fixed shaft 1. On the periphery of this fixed-shaft supporting member 1A, there is provided a fixed-shaft yoke 1B. Furthermore, there are provided first, second and third ring-shaped stator yokes 9, 10, and 11 which are each disposed via a magnet cylinder 8E on the fixed-shaft yoke 1B at parallel locations apart from each other in the axial direction so that these elements are formed into an integral fashion in which the magnet cylinders 8E are located in the middle in radial directions between the stator yokes and the fixed-shaft yoke 1B. First, second and third coil reception slots 20*u*, 20*v* and 21*w* are formed on the periphery of the respective stator yokes 9, 10 and 11, at the center in the axial direction of each stator yoke 9, 10, 11. The stator yokes 9–11 constitute a set of stator yokes 100. At either end of the set of stator yokes 100, there is provided a first or second auxiliary cylinder 103, 104 which is fixed in an integral fashion on the fixed shaft 1 via an auxiliary magnet cylinder 101 or 102 disposed at either side of the magnet cylinder 8. A first U-phase coil 22 and second V-phase coil 23 and third W-phase coil 24 each wound into the form of a bobbin are disposed in the coil reception slots 20*u*, 20*v* and 20*w*, respectively (these coils 22, 23 and 24 are wound from the outer side using an automated winding machine). First and second north poles N1 and N2 are formed on the periphery of the first stator yoke 9 in such a manner that the first coil 22 is located between the first and second north poles N1 and N2. First and second south poles S1 and S2 are formed on the periphery of the second stator yoke 10 in such a manner that the second coil 23 is located between the first and second south poles S1 and S2. Similarly, third and fourth north poles N3 and N4 are formed on the periphery of the third stator yoke 11 in such a manner that the third coil 24 is located between the third and fourth north poles N3 and N4. The respective poles N1, N2, S1, S2, N3, and N4 are arranged in such a manner as to correspond to the rotor teeth 7. A plurality of stator teeth 9a, 10a and 11a having the same pitch as that of the rotor teeth 7 are formed on the periphery of each pole N1, N2, S1, S2, N3 and N4. In the poles N1 and N2, as shown in FIG. 28, stator teeth 9a, 10a and 11a are formed in such a manner that the locations of the teeth on the pole N1 are shifted by an amount of ½ pitch (1π) relative to the locations of the teeth on the pole N2. Similarly, the locations of the teeth on the pole S1 are shifted by an amount of ½ pitch (1π) relative to the locations of the teeth on the pole S2. Furthermore, the stator teeth 9a, 10a, 11a are formed at locations so that there is a shift of ⅙ pitch (=½n pitch wherein n is the number of phases, or π/3 in this case) between those on the north poles N1, N2 and the south poles S1, S2, and there is also a shift of ⅙ pitch between those on the south poles S1, S2 and the north poles N3, N4. In this structure, the auxiliary magnetic plates 103 and 104 serve to provide a path of magnetic flux.

Figure 24:
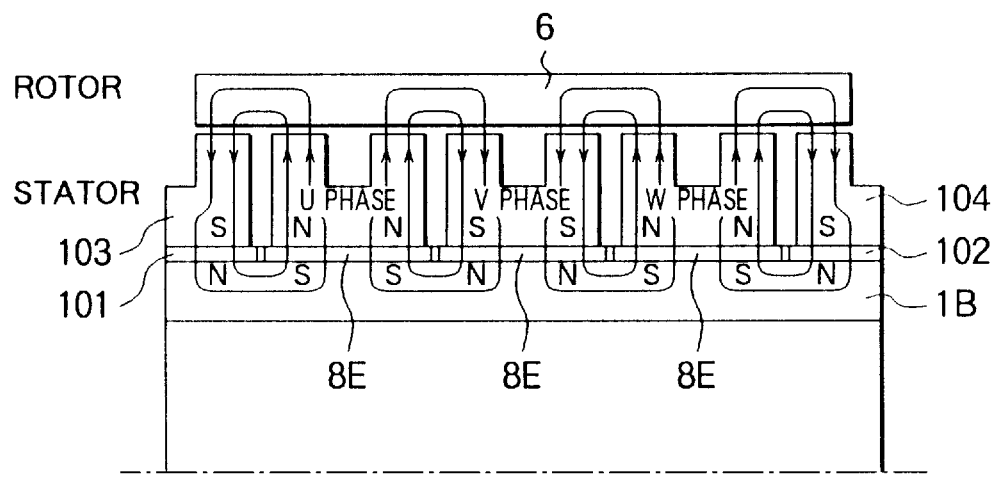
FIG. 24 is a schematic diagram illustrating the flow of magnetic flux generated by each magnet plate shown in FIG. 23.
Figure 25:
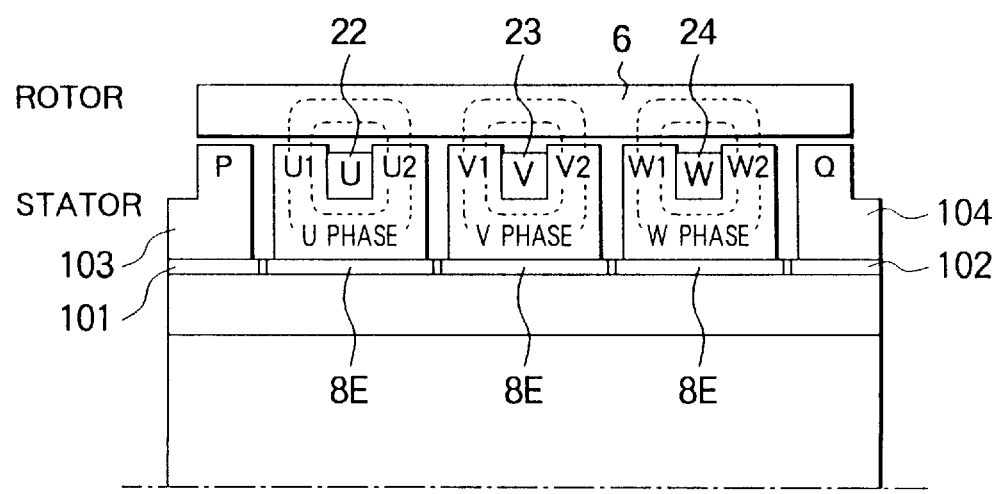
FIG. 25 is a schematic diagram illustrating the flow of magnetic flux generated by coils shown in FIG. 23.

Now, the operation will be described below. FIG. 24 illustrates the magnetic flux generated by the magnet cylinder 8E and the auxiliary magnet cylinders 101 and 102. FIG. 24 also shows auxiliary magnetic cylinders 103 and 104 which cause the magnetic flux to be equally divided. If the auxiliary magnet cylinders 101, 102 and auxiliary magnetic cylinders 103, 104 are not provided, then the magnetic flux generated by the two magnet cylinders 8E will tend to be concentrated within the V-phase stator yoke 10 at the center and thus the magnetic flux density in the V-phase stator yoke 10 will become (about twice) greater than those in the U-phase and W-phase yokes at either side of the V-phase stator yoke 10. As a result, ununiformity occurs in the distribution of the magnetic flux among three phases, and a correct motor operation is no longer achieved. As described above, the auxiliary magnet cylinders 101, 102 and auxiliary magnetic cylinders 103 and 104 play an important role to form a required magnetic path thereby achieving good uniformity in the magnetic flux. FIG. 25 shows the magnetic flux generated by the coils 22, 23, and 24 of U-, V-, and W-phases wherein the direction of the magnetic flux varies depending on the direction of the current flowing through the coils 22, 23 and 24.

Figure 26:
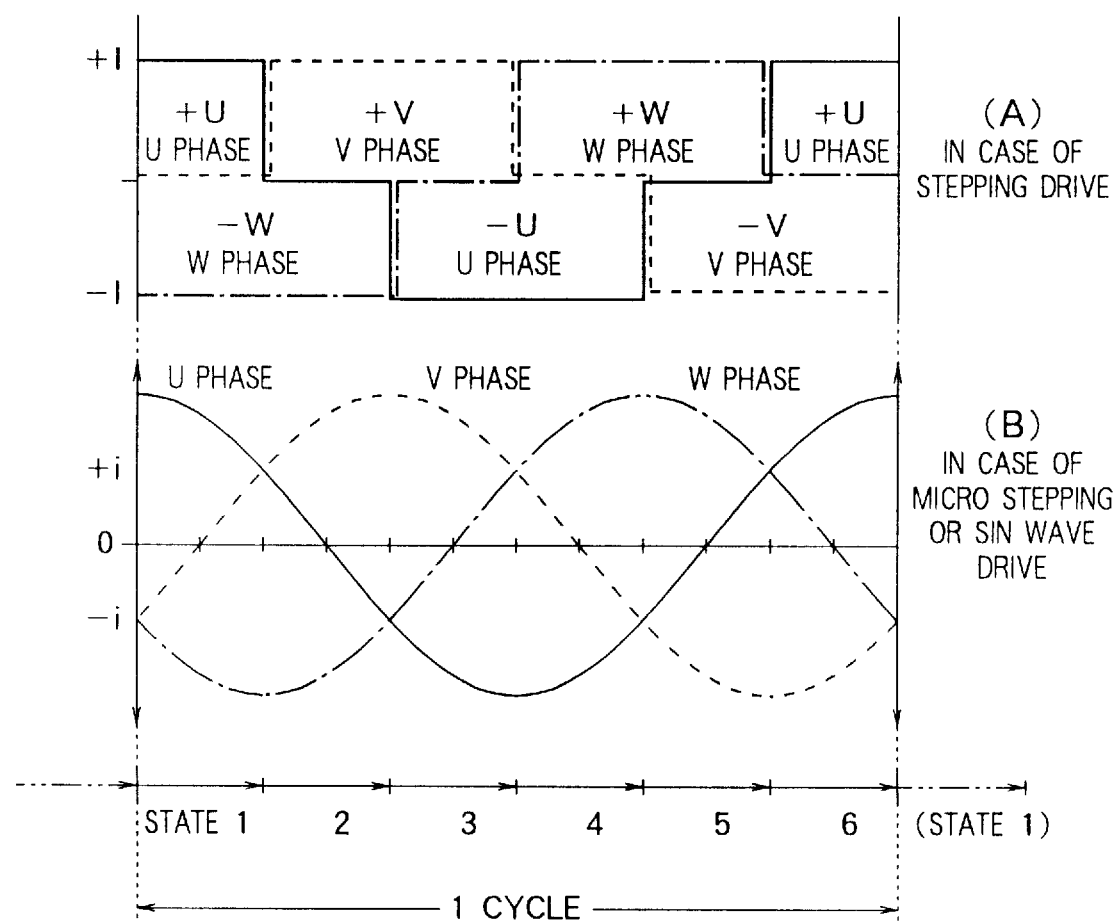
FIG. 26 is a schematic illustration of the operation of driving a stepping motor shown in FIG. 23.

FIG. 26 illustrates some specific examples of currents flowing through the coils 22, 23, and 24. In the example shown in FIG. 26A, the coils are driven in a step fashion so that the driving current with a constant magnitude is abruptly turned on and off. On the other hand, in the case of FIG. 26B, the current is gradually changed according to the well-known micro-step method or changed in a sinusoidal fashion. In each case, one cycle is divided into six states (states 1 through 6) which will be described in further detail below in conjunction with FIG. 27.

Figure 27:
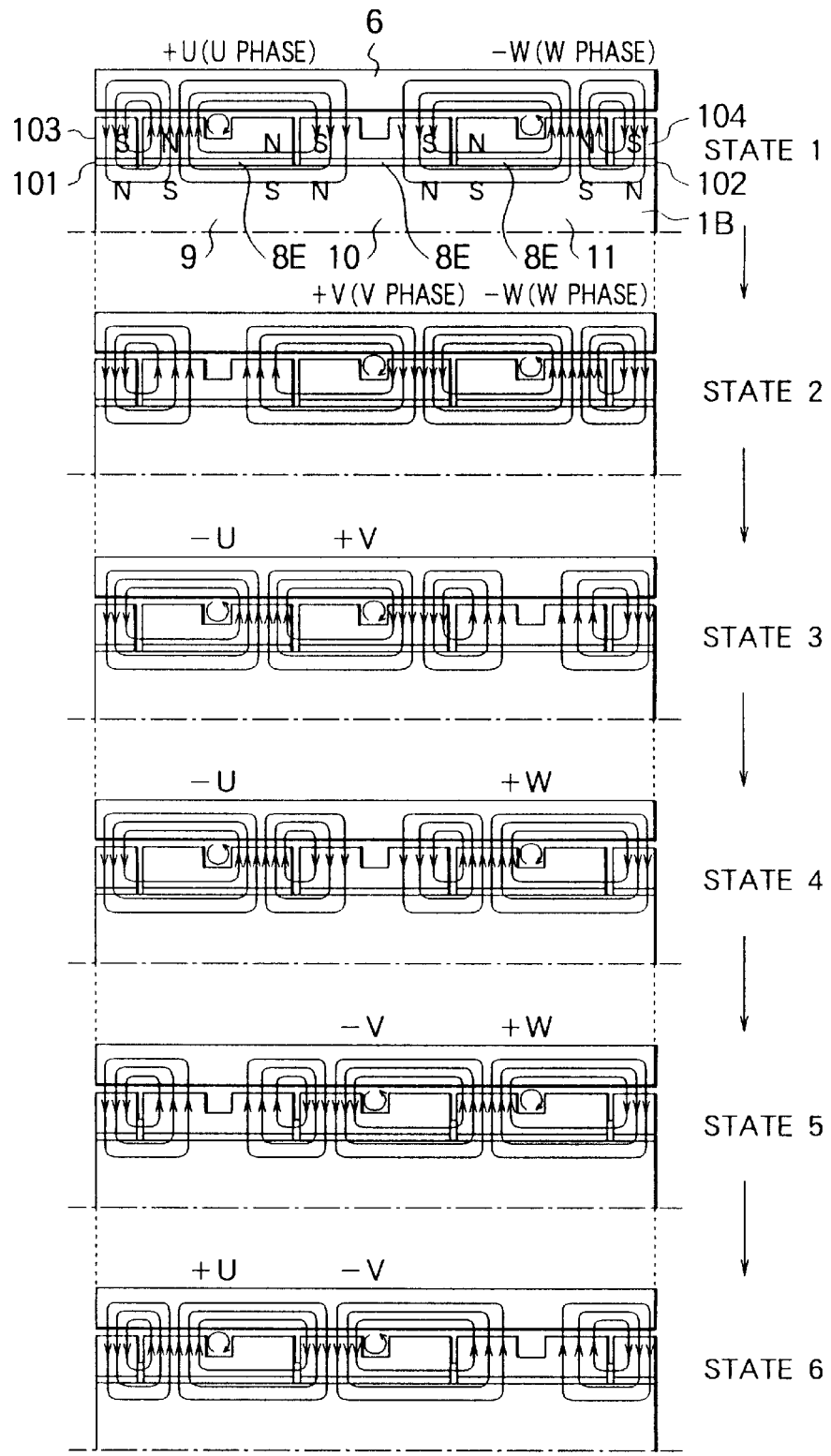
FIG. 27 is a schematic illustration of the operation of step-driving the stepping motor shown in FIG. 23 for each state of the operation.

FIG. 27 illustrates the overall magnetic flux generated by the magnet plate 8, the auxiliary magnet cylinders 8E and the current which flows in each driving state 1 through 6 for the two driving modes: the step driving mode shown in FIG. 26A and the micro-step driving mode or sinusoidal driving mode shown in FIG. 26B.

Also in this case, the auxiliary magnetic cylinders 103 and 104 and the auxiliary magnet cylinders 101 and 102 according to the present invention play an important role to obtain uniform distribution of the overall magnetic flux.

FIG. 28 shows the locations of the rotor teeth 7 relative to the locations of the stator teeth 9a, 10a, and 11a, in relation to FIG. 27. As shown in FIG. 28, the rotor teeth 7 move in location systematically in response to each state 1 through 6. In this three-phase motor, as described above, the auxiliary magnetic cylinders 103 and 104 disposed at either side of the set of stator yokes 100 and the auxiliary magnet cylinders 101 and 102 are essential to achieve the motor operation.

Figure 29:
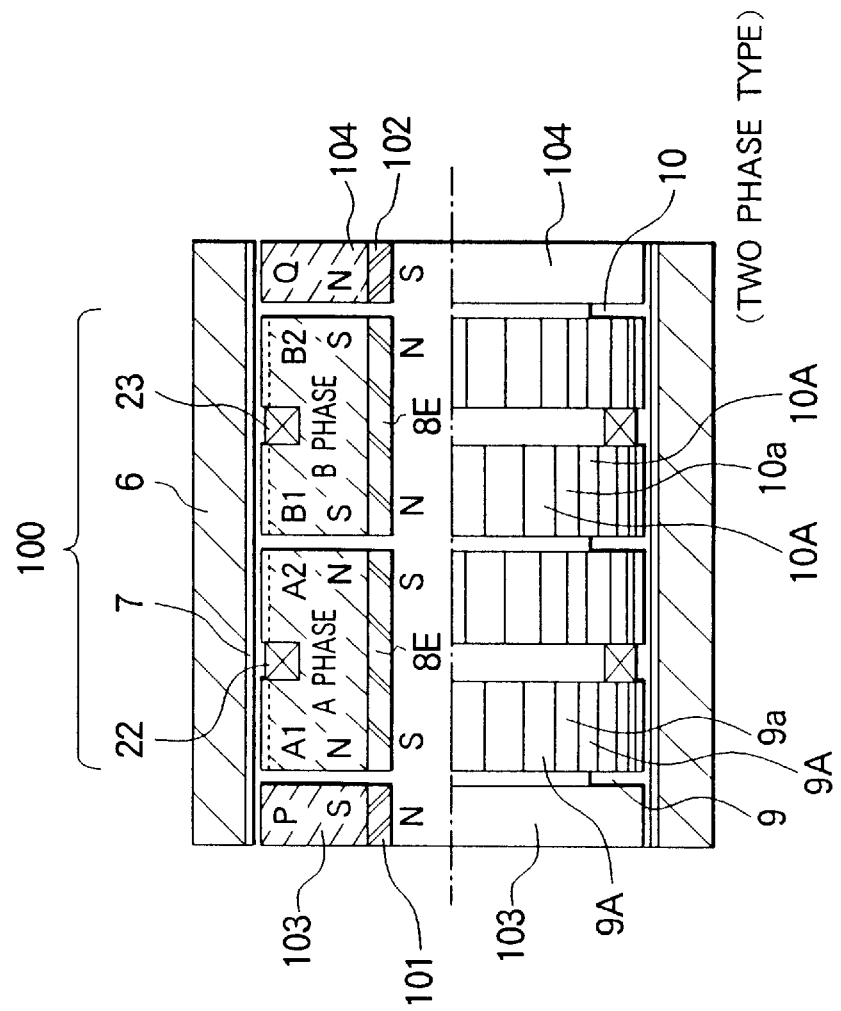
FIG. 29 is a half cross-sectional view illustrating a 2-phase type stepping motor based on the structure shown in FIG. 23.

Referring now to FIG. 29, the structure shown in FIG. 23 is applied to a two-phase structure. In the stator yokes 9 and 10 of this two-phase structure, there is a shift of ½ pitch between A1 and A2 and also between B1 and B2. On the other hand, there is a shift of ½n or ¼ pitch between phase A and phase B. Although in the case of the two-phase motor, the auxiliary magnet plates cylinders 101 and 102 and the auxiliary magnetic cylinders 103 and 104 are not necessarily required, these elements are also useful even in the two-phase motor in the sense that the auxiliary magnet cylinders 101 and 102 located at either side of the stator yokes 9 and 10 allow the stator yokes 9 and 10 to be excited uniformly, which results in a great output torque with less irregularity.

Figure 30:
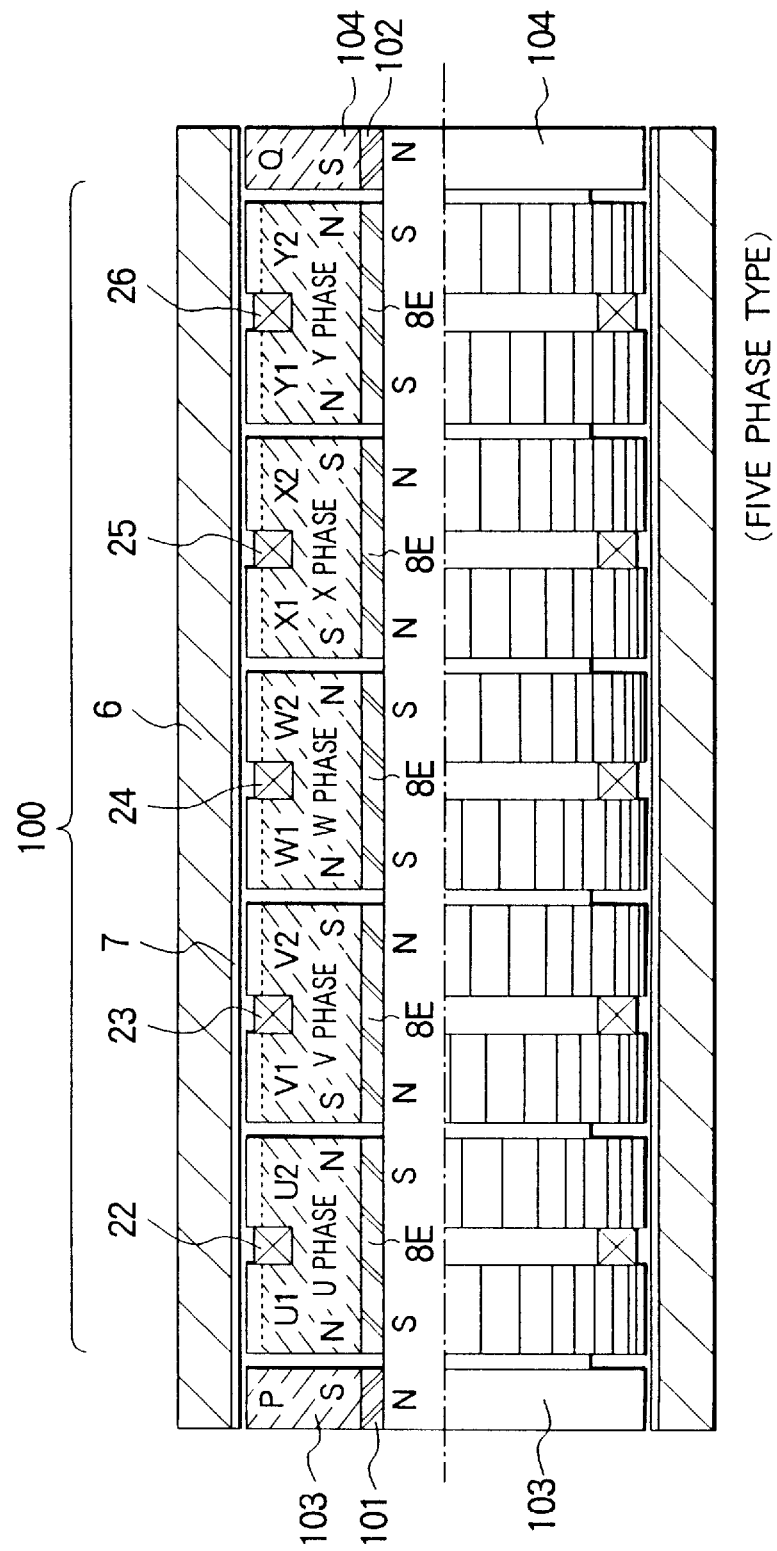
FIG. 30 is a half cross-sectional view illustrating a 5-phase type stepping motor based on the structure shown in FIG. 23.

In the example shown in FIG. 30, the above structure is used to realize a 5-phase stepping motor. In each phase U, V, W, X, and Y, there is a shift of ½ pitch between U1 and U2, between V1 and V2, between W1 and W2, between X1 and X2, and between Y1 and Y2. On the other hand, there is a phase-to-phase shift equal to ½n=⅒ pitch.

As described above with reference to FIGS. 23–30, the present invention may be applied to a stepping motor with phases from 2 to n whatever they are odd or even.

Figure 31:
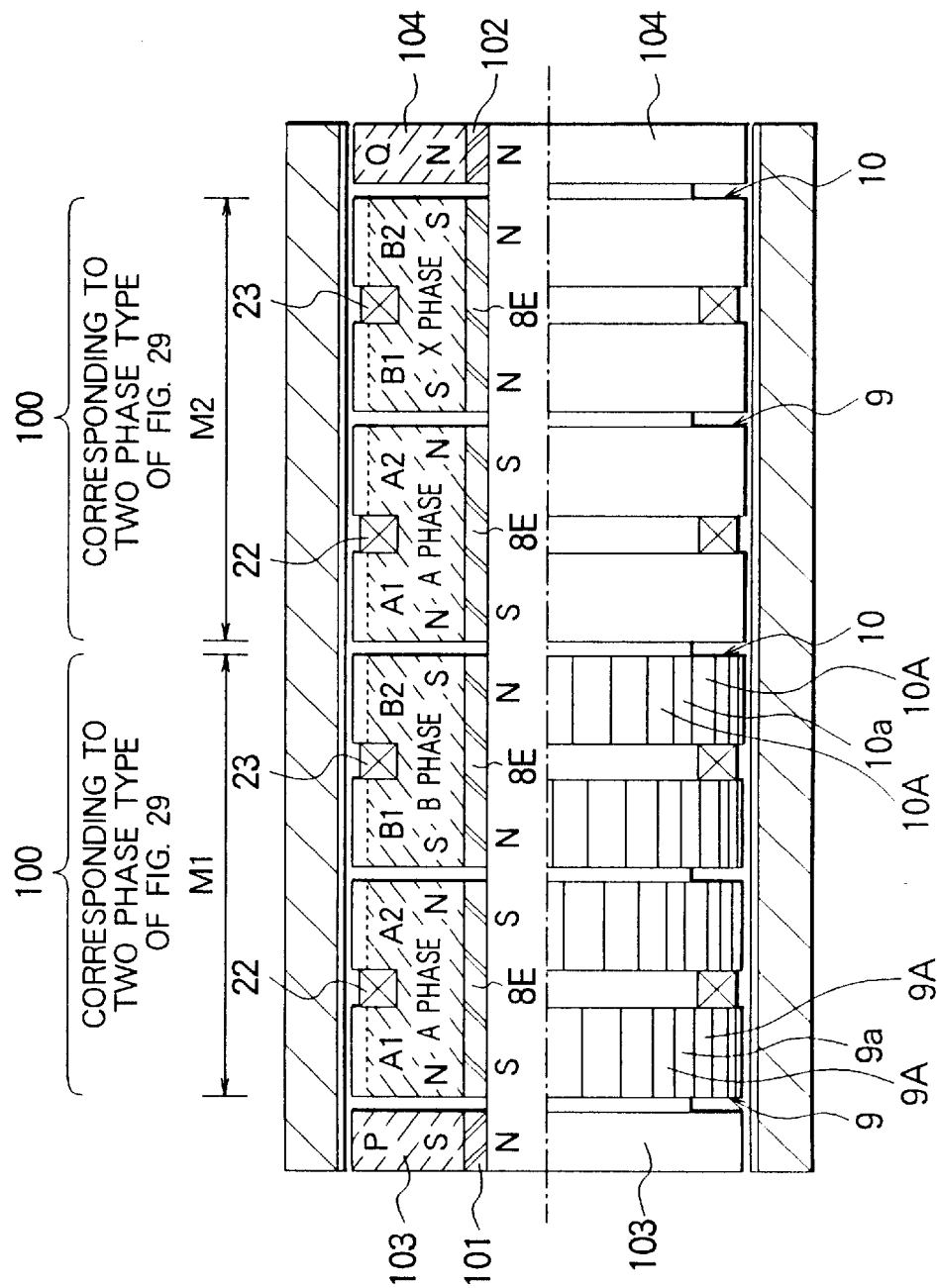
FIG. 31 is a half cross-sectional view of a combined construction including two cascaded 2-phase stepping motors of the type shown in FIG. 29.

In still another embodiment shown in FIG. 31, two 2-phase motors (M1 and M2) of the type shown in FIG. 29 are combined into a cascaded fashion. That is, in this cascaded construction shown in FIG. 31, two sets of stator yokes 100 of the type shown in FIG. 29 are combined into a single form wherein a magnet cylinder 8 is disposed on each set of stator yokes 100 wherein auxiliary magnet cylinders 101 and 102 and auxiliary magnetic cylinders 103 and 104 are disposed at either end of the overall structure in a similar manner to the structure shown in FIG. 29. Furthermore, plural sets of stator yokes 100 as many as N sets may be combined into a single form in a similar manner so as to realize a hybrid stepping motor with either an outer or inner rotor structure having as many cascaded sets of stator yokes 100 as desired. Also in this structure, unlike the construction obtained by combining two separate motors M1 and M2 via the coaxial shaft, a magnetic path is formed between M1 and M2 and thus the auxiliary magnet cylinders 101 and 102 and also the auxiliary magnetic cylinders 103 and 104 play an important role similar to the structure shown in FIG. 23. Although in the specific embodiment described above with reference to FIG. 31, a plurality of 2-phase motors of the type shown in FIG. 29 are used to obtain a combined construction, motors of the type shown in FIG. 23 or 30 or otherwise of the type which will be described later with reference to FIG. 32 may also be employed. In general, a plurality of n-phase motors as many as N may be combined into a cascaded fashion so as to achieve a greater torque as required.

In an embodiment shown in FIG. 22 the conventional hybrid type stepping motor with an inner rotor structure shown in FIG. 1 is modified in such a manner as to construct a hybrid type stepping motor with an inner rotor structure according to the present invention. On the inner wall of a stator case 300, there are provided first, second and third ring-shaped stator yokes 106, 107 and 108 each disposed via a ring-shaped magnet cylinder 8 at parallel locations apart in the axial direction wherein they are formed in an integral fashion so as to construct a 3-phase stator yoke set 100. The respective stator yokes 106, 107 and 108 form magnetic poles with polarities different from each other.

Furthermore, auxiliary magnet cylinders 101, 102 and auxiliary magnetic cylinders 103, 104 are disposed at either side of the set of stator yokes 100 thereby forming a magnetic circuit at either end. First, second and third coils 22, 23 and 24 in the form of a bobbin are disposed in coil reception slots 20u, 20v, and 20w of the ring-shaped stator yokes 106,107, and 108, respectively. On a revolving shaft 200 made of a magnetic material, there is provided a long rotor yoke 109 corresponding to three sets of stator yokes 106,107, and 108. A plurality of rotor teeth 109a are formed on the periphery of the rotor yoke 109. As can be seen from the above description, the embodiment shown in FIG. 32 has an inner rotor structure which is an invert of that shown in FIG. 23, and thus it can be driven in a step fashion according to the same manner as the operation shown in FIGS. 24–28.

The method employed to achieve the construction shown in FIG. 32 may also be used to realize a 2-phase inner rotor type stepping motor corresponding to FIG. 29 and a 5-phase inner rotor type stepping motor corresponding to FIG. 31, and, furthermore, may be generally employed to an n-phase inner rotor type stepping motor.

In the previous embodiment, a plurality of units having the structure shown in FIG. 29 are combined in a cascaded fashion to obtain the structure shown in FIG. 31. In general, a plurality of units each having an n-phase inner rotor structure may also be cascaded into the structure shown in FIG. 31. In these specific embodiments, although the coils 22 and 23 are of the type of bipolar winding, the coils 22 and 23 may also be of the type of unipolar winding. Furthermore, although one-phase excitation is employed in the above embodiments, two-phase or one/two-phase excitation may also be employed. The above-described shifts in the locations of teeth 7, 9a, 11a, and 109a may be introduced in a relative fashion and thus either side may be shifted. Furthermore, the motor may be formed into various shapes such as a thin, thin and large diameter, thin and long shape, etc. Furthermore, although one separate magnet cylinder 8E is provided for each phase in the embodiments described above, these magnet cylinders may also be formed into a single unit which is properly magnetized.

Also in the embodiments shown in FIGS. 23–31, magnets 7A, 9A, 10A and 11A may be disposed in such a manner that a magnet is located either in each space between rotor teeth 7 or in each space between stator teeth 9a, 10a, and 11a or otherwise may be disposed in such a manner that a magnet is located in each space between rotor teeth 7 and also in each space between stator teeth 9a, 10a and 11a.

Similarly, in the case of the structure shown in FIG. 32, magnets may be disposed in the spaces between stator teeth 106a, 107a, and 108a and between rotor teeth 109a.

In the present invention, as described above, the hybrid type stepping motor may be constructed into various structures having the following advantages. In the structure shown in FIG. 2, since coils are located on the periphery of a stator yoke, the coils can be wound very easily. This allows a great reduction in the cost of a hybrid type stepping motor with the outer rotor structure. In the case of the structure shown in FIG. 7, coils wound into the form of a bobbin can be easily inserted from the inner side of the stator yoke. This allows a great reduction in the cost required for assembling a motor. Furthermore, auxiliary magnet cylinders are disposed so that a magnetic path is provided at either end of a motor thereby forming a magnetic pole at either end of a magnet cylinder. Thus, in the structure according to the present invention, it is possible to obtain a large torque. Furthermore, it is possible to realize an n-phase stepping motor.

In the case of an n-phase stepping motor, stator yokes are shifted from each other by an amount of ½n pitch. A stepping motor having a desired number of phases (from 2 through n) can be realized with stators and rotor yokes having the same structure. According to the present invention, it is also possible to combine plural (N) sets of stator yokes into a single unit so as to realize a stepping motor of the hybrid type with either outer or inner rotor structure. Furthermore, a magnet is disposed in each space between adjacent teeth of either the rotor or stator or otherwise of both the rotor and stator. This allows an abrupt change in the magnetic flux between the rotor and stator and thus a greater torque can be achieved.

What is claimed is:

1. A stepping motor of the hybrid type comprising:
    a pair of bearings disposed on a fixed shaft, at locations spaced apart from each other;
    a rotor case arranged to freely rotate via each of said bearings;
    a ring-shaped rotor yoke having a plurality of rotor teeth and disposed on the inner wall of said rotor case;
    first and second stator yokes disposed on said fixed shaft, said first stator yoke being separated in the axial direction by a magnet plate from said second stator yoke;
    a plurality of stator teeth formed in a circumferential direction on the outer periphery of each said stator yoke;
    first and second coil reception slots formed on the outer periphery of said stator yokes, respectively, at the center in the axial direction of each said stator yoke; and
    first and second coils disposed in said coil reception slots, respectively; wherein:
        said stator yokes form magnetic poles with polarities different from each other;
        magnets are disposed in at least one of each space between adjacent rotor teeth and each space between adjacent stator teeth; and
        the direction of the magnetic flux within each magnet is opposite to the direction of the magnetic flux present between said ring-shaped rotor yoke and said stator yokes.

2. A stepping motor of the hybrid type comprising:
    a pair of bearings disposed at either end of a casing;
    a revolving shaft arranged to freely rotate via said bearings;
    first and second ring-shaped stator yokes disposed on the inner wall of said casing, said first ring-shaped stator yoke being separated in the axial direction by a ring-shaped magnet plate from said second ring-shaped stator yoke;
    a plurality of stator teeth formed in a circumferential direction on the inner wall of each said ring-shaped stator yoke;
    first and second coil reception slots formed on the inner periphery of the first and second ring-shaped stator yokes, respectively, at the center in the axial direction of each said stator yoke;

first and second coils disposed in said first and second coil reception slots, respectively;

a rotor yoke disposed on said revolving shaft, at a location corresponding to said stator yokes; and a plurality of rotor teeth formed in a circumferential direction on the outer periphery of said rotor yoke; wherein:

magnets are disposed either in each space between adjacent rotor teeth or in each space between adjacent stator teeth, or otherwise disposed in each space between adjacent rotor teeth and also in each space between stator teeth; and the direction of the magnetic flux within each magnet is opposite to the direction of the magnetic flux present between said rotor yoke and said ring-shaped stator yokes.

3. A stepping motor of the hybrid type comprising:

a pair of bearings disposed at locations spaced from each other on a fixed shaft;

a rotor case arranged to freely rotate via said bearings;

a ring-shaped rotor yoke having a plurality of rotor teeth and disposed on the inner wall of said rotor case;

a magnet cylinder disposed on the outer periphery of said fixed shaft;

a pair of first and second ring-shaped stator yokes fitted on the outer periphery of said magnet cylinder;

a plurality of stator teeth formed in a circumferential direction on the outer periphery of each said ring-shaped stator yoke;

first and second coil reception slots formed on the outer periphery of said first and second ring-shaped stator yokes, respectively, at the center in the axial direction of each said ring-shaped stator yoke; and first and second coils disposed in said coil reception slots, respectively; wherein:

said ring-shaped stator yokes form magnetic poles with polarities different from each other;

magnets are disposed either in each space between adjacent rotor teeth or in each space between adjacent stator teeth, or otherwise disposed in each space between adjacent rotor teeth and also in each space between stator teeth; and the direction of the magnetic flux within each magnet is opposite to the direction of the magnetic flux present between said ring-shaped rotor yoke and said ring-shaped stator yokes.

4. A stepping motor of the hybrid type according to claim 3, wherein a space is formed between said ring-shaped stator yokes.

5. A stepping motor of the hybrid type comprising:

bearings disposed on a fixed shaft;

a cylindrical rotor arranged to freely rotate via said bearings;

a plurality of rotor teeth formed on the inner and outer peripheries of said cylindrical rotor;

first and second inner stator yokes and first and second outer stator yokes disposed on said fixed shaft, said first inner stator yoke and said first outer stator yoke being separated in the axial direction by a magnet plate from said second inner stator yoke and said second outer stator yoke;

a plurality of stator teeth formed in a circumferential direction on the walls of said stator yokes;

first through fourth coil reception slots formed on the periphery of said inner and outer stator yokes, said coil reception slots being located at the center in the axial direction of each said stator yoke, said coil reception slots facing said cylindrical rotor; and first through fourth coils which are each wound into the form of a bobbin and disposed in the corresponding coil reception slots; wherein:

said stator yokes form magnetic poles with polarities different from each other;

said coils are arranged so that said cylindrical rotor is located between said coils;

magnets are disposed either in each space between adjacent rotor teeth or in each space between adjacent stator teeth, or otherwise disposed in each space between adjacent rotor teeth and also in each space between stator teeth; and the direction of the magnetic flux within each magnet is opposite to the direction of the magnetic flux present between said cylindrical rotor and said stator yokes.

6. A stepping motor of the hybrid type according to claim 5, wherein said magnet plate comprises first and second magnets, said first magnet being disposed between said inner stator yokes, said second magnet being disposed between said outer stator yokes.

7. A stepping motor of the hybrid type according to claim 5, wherein said magnet plate comprises first and second magnets, said first magnet being disposed between said fixed shaft and said inner stator yokes, said second magnet being disposed between an outer shell of said fixed shaft and said outer stator yokes, said magnets being located opposite each other via said cylindrical rotor.

8. A stepping motor of the hybrid type with an outer rotor structure, comprising:

a pair of bearings disposed on a fixed shaft, at locations spaced apart from each other;

a rotor case arranged to freely rotate via said bearings;

a ring-shaped rotor yoke having a plurality of rotor teeth and disposed on said rotor case;

a set of stator yokes including n stator yokes disposed on said fixed shaft, said n stator yokes being separated from each other in the axial direction by a magnet plate;

a plurality of stator teeth formed in a circumferential direction on the outer periphery of each said stator yoke;

n coil reception slot formed on the outer periphery of said ring-shaped stator yokes, at the center in the axial direction of the corresponding ring-shaped stator yokes;

n coil disposed in the corresponding coil reception slots; and a pair of auxiliary magnetic plates disposed on said fixed shaft, at either end of said set of stator yokes, each said auxiliary magnetic plate being seperated from said set of stator yokes by an auxiliary magnet plate; wherein:

said stator yokes form magnetic poles with polarities different from each other;

the magnetic flux emerging from said auxiliary magnet plate passes through said auxiliary magnetic plates;

magnets are disposed either in at least one of each space between adjacent rotor teeth and each space between adjacent stator teeth; and the direction of the magnetic flux within each magnet is opposite to the direction of the magnetic flux present between said ring-shaped rotor yoke and said stator yokes.

9. A stepping motor of the hybrid type according to claim 8, wherein said set of stator yokes includes three stator yokes arranged to be driven in a three-phase fashion.

10. A stepping motor of the hybrid type according to claim 8, wherein said set of stator yokes includes two stator yokes arranged to be driven in a two-phase fashion.

11. A stepping motor of the hybrid type with an inner rotor structure, comprising:

a pair of bearings disposed at either end of a casing;

a revolving shaft arranged to freely rotate via said bearings;

a set of stator yokes including n ring-shaped stator yokes disposed on the inner wall of said casing, said n ring-shaped stator yokes being separated from each other in the axial direction by a ring-shaped magnet plate;

a plurality of stator teeth formed in a circumferential direction on the inner wall of each said ring-shaped stator yoke;

a pair of auxiliary magnetic plates disposed at either end of said set of stator yokes, each said auxiliary magnetic plate being separated from said set of stator yokes by an auxiliary magnet plate;

n coil reception slots formed on the inner periphery of said ring-shaped stator yokes, at the center in the axial direction of the corresponding ring-shaped stator yokes;

n coils disposed in the corresponding coil reception slots; and a rotor yoke disposed on said revolving shaft, at a location corresponding to said stator yokes; and a plurality of rotor teeth formed in a circumferential direction on the outer periphery of said rotor yoke; wherein:

the magnetic flux emerging from said auxiliary magnet plate passes through said auxiliary magnetic plates;

magnets are disposed either in each space between adjacent stator teeth or in each space between adjacent rotor teeth, or otherwise disposed in each space between adjacent stator teeth and also in each space between adjacent rotor teeth; and the direction of the magnetic flux within each magnet is opposite to the direction of the magnetic flux present between said ring-shaped stator yokes and said rotor yoke.

12. A stepping motor of the hybrid type according to claim 11, wherein said set of stator yokes includes three ring-shaped stator yokes arranged to be driven in a three-phase fashion.

13. A stepping motor of the hybrid type according to claim 11, wherein said set of stator yokes includes two ring-shaped stator yokes arranged to be driven in a two-phase fashion.

14. A stepping motor of the hybrid type with an outer rotor structure, according to claim 8, wherein there are provided a plurality of sets of stator yokes as many as N sets, said plurality of sets of stator yokes being separated from each other by a magnet plate.

15. A stepping motor of the hybrid type with an outer rotor structure, according to claim 9, wherein there are provided a plurality of sets of stator yokes as many as N sets, said plurality of sets of stator yokes being separated from each other by a magnet plate.

16. A stepping motor of the hybrid type with an outer rotor structure, according to claim 10, wherein there are provided a plurality of sets of stator yokes as many as N sets, said plurality of sets of stator yokes being separated from each other by a magnet plate.

17. A stepping motor of the hybrid type with an inner rotor structure, according to claim 11, wherein there are provided a plurality of sets of stator yokes as many as N sets, said plurality of sets of stator yokes being separated from each other by a magnet plate.

18. A stepping motor of the hybrid type with an inner rotor structure, according to claim 12, wherein there are provided a plurality of sets of stator yokes as many as N sets, said plurality of sets of stator yokes being separated from each other by a magnet plate.

19. A stepping motor of the hybrid type with an inner rotor structure, according to claim 13, wherein there are provided a plurality of sets of stator yokes as many as N sets, said plurality of sets of stator yokes being separated from each other by a magnet plate.

20. A stepping motor of the hybrid type with an outer rotor structure, comprising:

a pair of bearings disposed on a fixed shaft, at locations spaced apart from each other;

a rotor case arranged to freely rotate via said bearings;

a ring-shaped rotor yoke having a plurality of rotor teeth and disposed on said rotor case;

a set of stator yokes including n stator yokes disposed on said fixed shaft via a magnet cylinder, said n stator yokes being arranged at parallel locations along the axial direction;

a plurality of stator teeth formed in a circumferential direction on the outer periphery of each said stator yoke;

n coil reception slots formed on the outer periphery of said ring-shaped stator yokes, at the center in the axial direction of the corresponding ring-shaped stator yokes;

n coils disposed in the corresponding coil reception slots; and a pair of auxiliary magnetic plates each disposed on said fixed shaft via an auxiliary magnet cylinder, said pair of auxiliary magnetic plates being located at either end of said set of stator yokes; wherein:

said stator yokes form magnetic poles with polarities alternately different from each other;

the magnetic flux emerging from said auxiliary magnet cylinders passes through said auxiliary magnetic cylinders;

magnets are disposed either in each space between adjacent rotor teeth or in each space between adjacent stator teeth, or otherwise disposed in each space between adjacent rotor teeth and also in each space between stator teeth; and the direction of the magnetic flux within each magnet is opposite to the direction of the magnetic flux present between said ring-shaped rotor yoke and said stator yokes.

21. A stepping motor of the hybrid type according to claim 16, wherein said set of stator yokes includes three stator yokes arranged to be driven in a three-phase fashion.

22. A stepping motor of the hybrid type according to claim 16, wherein said set of stator yokes includes two stator yokes arranged to be driven in a two-phase fashion.

23. A stepping motor of the hybrid type with an inner rotor structure, comprising:

a pair of bearings disposed at either end of a casing;

a revolving shaft arranged to freely rotate via said bearings;

a set of stator yokes including n ring-shaped stator yokes disposed on the inner wall of said casing via a ring-shaped magnet cylinder, said n ring-shaped stator yokes being arranged at parallel locations along the axial direction;

a plurality of stator teeth formed in a circumferential direction on the inner wall of each said ring-shaped stator yoke;

a pair of auxiliary magnetic cylinders each disposed on said casing via an auxiliary magnet plate, said pair of auxiliary magnetic cylinders being located at either end of said set of stator yokes;

n coil reception slots formed on the inner periphery of said ring-shaped stator yokes, at the center in the axial direction of the corresponding ring-shaped stator yokes;

n coils disposed in the corresponding coil reception slots; and a rotor yoke disposed on said revolving shaft, at a location corresponding to said stator yokes; and a plurality of rotor teeth formed in a circumferential direction on the outer periphery of said rotor yoke; wherein:

the magnetic flux emerging from said auxiliary magnet cylinders passes through said auxiliary magnetic cylinders;

magnets are disposed either in each space between adjacent stator teeth or in each space between adjacent rotor teeth, or otherwise disposed in each space between adjacent stator teeth and also in each space between adjacent rotor teeth; and the direction of the magnetic flux within each magnet is opposite to the direction of the magnetic flux present between said ring-shaped stator yokes and said rotor yoke.

24. A stepping motor of the hybrid type according to claim 19, wherein said set of stator yokes includes three ring-shaped stator yokes arranged to be driven in a three-phase fashion.

25. A stepping motor of the hybrid type according to claim 19, wherein said set of stator yokes includes two ring-shaped stator yokes arranged to be driven in a three-phase fashion.

26. A stepping motor of the hybrid type with an outer rotor structure, according to claim 20, wherein there are provided a plurality of sets of stator yokes as many as N sets disposed via a magnet cylinder.

27. A stepping motor of the hybrid type with an outer rotor structure, according to claim 21, wherein there are provided a plurality of sets of stator yokes as many as N sets disposed via a magnet cylinder.

28. A stepping motor of the hybrid type with an outer rotor structure, according to claim 22, wherein there are provided a plurality of sets of stator yokes as many as N sets disposed via a magnet cylinder.

29. A stepping motor of the hybrid type with an inner rotor structure, according to claim 23, wherein there are provided a plurality of sets of stator yokes as many as N sets disposed via a magnet cylinder.

30. A stepping motor of the hybrid type with an inner rotor structure, according to claim 24, wherein there are provided a plurality of sets of stator yokes as many as N sets disposed via a magnet cylinder.

31. A stepping motor of the hybrid type with an inner rotor structure, according to claim 25, wherein there are provided a plurality of sets of stator yokes as many as N sets disposed via a magnet cylinder.

* * * * *